United States Patent
Ochiai et al.

(10) Patent No.: US 7,665,683 B2
(45) Date of Patent: Feb. 23, 2010

(54) FISHING LINE GUIDING MECHANISM OF SPINNING REEL

(75) Inventors: Koji Ochiai, Sakai (JP); Keigo Kitajima, Sakai (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 12/267,622

(22) Filed: Nov. 10, 2008

(65) Prior Publication Data
US 2009/0152389 A1 Jun. 18, 2009

(30) Foreign Application Priority Data

Dec. 18, 2007 (JP) ............................ 2007-326567
Oct. 7, 2008 (JP) ............................ 2008-260688

(51) Int. Cl.
*A01K 89/01* (2006.01)
(52) U.S. Cl. ...................................... 242/231; 242/232
(58) Field of Classification Search ................ 242/231, 242/232
See application file for complete search history.

(56) References Cited

U.S. PATENT DOCUMENTS

| 4,562,976 | A | * | 1/1986 | Ban ............................ 242/231 |
| 5,261,627 | A | * | 11/1993 | Shinohara ................... 242/231 |
| 5,730,377 | A | * | 3/1998 | Shinohara ................... 242/231 |
| 5,911,377 | A | * | 6/1999 | Jung ........................... 242/231 |
| 5,954,284 | A | * | 9/1999 | Tsukihiji et al. ............ 242/231 |
| 6,161,786 | A | * | 12/2000 | Ohara et al. ................ 242/231 |
| 6,637,690 | B2 | * | 10/2003 | Matsuda ..................... 242/231 |
| 6,905,086 | B2 | * | 6/2005 | Sugawara et al. ........... 242/231 |
| 2006/0027691 | A1 | | 2/2006 | Ochiai |

FOREIGN PATENT DOCUMENTS

JP 2006-42740 A 2/2006

* cited by examiner

*Primary Examiner*—Emmanuel M Marcelo
(74) *Attorney, Agent, or Firm*—Shinjyu Global IP

(57) ABSTRACT

A bail arm is provided in a spinning reel for guiding a fishing line to a spool and is mounted to a rotor that includes a first rotor arm and a second rotor arm opposed to the first rotor arm. The bail arm includes a first bail support member 40, a fixing shaft 43, a line roller 41, a fixing shaft cover 44, a fixing bolt 46, and an anti-rotation member 47. The first support member 40 is pivotally mounted to the first rotor arm. The fixing shaft 43 is fixed to the first support member 40. The fixing bolt 46 includes a non-circular head portion 46a and fixes the fixings shaft 43 to the first support member 40. The anti-rotation member 47 is detachably mounted to the first support member 40 and makes contact with the outer peripheral surface of the non-circular head portion 46a for preventing rotation of the fixing bolt 46.

26 Claims, 14 Drawing Sheets

FISHING LINE GUIDING MECHANISM OF SPINNING REEL

CROSS-REFERENCE TO RELATED APPLICATIONS

This application claims priority under 35 U.S.C. § 119 to Japanese Patent Application No. 2007-326567, filed on Dec. 18, 2007. The entire disclosure of Japanese Patent Application No. 2007-326567 is hereby incorporated herein by reference.

BACKGROUND OF THE INVENTION

1. Field of the Invention

The present invention generally relates to a fishing line guiding mechanism. More specifically, the present invention relates to a fishing line guiding mechanism for guiding a fishing line to a spool.

2. Background Information

A spinning reel that includes a spool is configured to reel out a fishing line forward. The length of the spool is arranged in the direction from the front to the rear of the spinning reel, and the fishing line is wound around the spool. In addition, the spinning reel includes a rotor. The rotor is configured to wind the fishing line around the spool while guiding the fishing line to the spool. Also, the rotor is mounted to the reel body and is capable of rotating around the shaft. The rotor is configured to rotate in conjunction with rotation of a handle.

The rotor includes a closed end tubular coupling part, a first rotor arm, and a second rotor arm. The coupling part is coupled to the tip of a pinion gear. The coupling part is capable of rotating with the pinion gear. The pinion gear is configured to rotate in conjunction with rotation of the handle. The first and second rotor arms protrude forward from opposed positions behind the coupling part. The tips of the first and second rotor arms are separated from the coupling part. A fishing line guiding mechanism is provided on the tips of the first and second rotor arms. It is possible to set the fishing line guiding mechanism in a line guiding posture for guiding the fishing line to the spool and a line releasing posture flipped from the line guiding posture.

For example, Japan Patent Application Publication No. JP-A-2006-42740 discloses a fishing line guiding mechanism. The conventional fishing line guiding mechanism includes a first bail support member, a second bail support member, a fixing shaft, a line roller, a fixing shaft cover, and a bail. Here, the first and second bail support members are coupled to the first and second rotor arms, respectively. The first and second bail support members are capable of pivoting. The fixing shaft is fixed to the first bail support member with a fixing bolt. The fixing shaft is fixed to the first bail support member with a fixing bolt. The line roller is rotatably supported by the fixing shaft. The fixing shaft cover is separately formed from the fixing shaft. The bail is formed integral with the fixing shaft cover and is coupled to the second bail support member. The fixing bolt penetrates the first bail support member and is screwed into the tip of the fixing shaft. The fixing bolt has a circular head portion. A circular recess is formed on the surface of the first bail support member for accommodating the head portion of the fixing bolt. Thus, the fishing line does not get stuck in the head portion.

The fishing line is reeled in by an angler when a fish bites the bait and pulls on the fishing line. When the fishing line guiding mechanism is in the line winding posture at the time of winding the fishing line, the fishing line is guided to the line roller and is wound around the spool. If a fishing rod is moved up and down while winding the fishing line around the spool, tension in the fishing line will greatly changed. Accordingly, the load applied to the line roller for guiding the fishing line will be changed. The load applied to the line roller may be changed depending on whether drag is actuated or not. When the load is changed, the fixing shaft supporting the line roller may be deflected from its original state and may be back to the original state. Thus, the fixing shaft may wobble slightly.

When the fixing shaft wobbles in the conventional fishing line guiding mechanism, the vibration is transmitted to the fixing bolt screwed into the fixing shaft. Furthermore, when vibration is transmitted to the fixing bolt, the fixing bolt may be loosened.

In view of the above, it will be apparent to those skilled in the art from this disclosure that there exists a need for an improved fishing line guide mechanism for a spinning reel. This invention addresses this need in the art as well as other needs, which will become apparent to those skilled in the art from this disclosure.

SUMMARY OF THE INVENTION

Accordingly, aspects of the present invention have been created to solve the above-mentioned problems occurring in the conventional practice, and to provide a fishing line guide mechanism in a spinning reel for preventing a fixing bolt fixing a fixing shaft to a first bail support member from being easily loosened.

In accordance with one aspect of the present invention, a fishing line guiding mechanism for a spinning reel is provided in a rotor including a first rotor arm and a second rotor arm opposed to the first rotor arm. The fishing line guiding mechanism includes a first bail support member, a fixing shaft, a line roller, a fixing shaft cover, a fixing member, and an anti-rotation member. The first bail support member is pivotally provided in the first rotor arm. The fixing shaft is fixed to the first bail support member. The line roller guides the fishing line and is rotatably supported by the fixing shaft. The fixing shaft cover is disposed in the tip side of the fixing shaft. The fixing member fixes the fixing shaft to the first bail support member, and includes a non-circular portion. The anti-rotation member is detachably mounted to the first bail support member. The anti-rotation member makes contact with the outer peripheral surface of the non-circular s portion for preventing rotation of the fixing member.

According to the fishing line guiding mechanism, the fixing shaft is fixed to the first bail support member by the fixing member having the non-circular portion. Furthermore, the line roller is rotatably supported by the fixing shaft, and guides the fishing line to the spool. Here, the anti-rotation member makes contact with the outer peripheral surface of the non-circular portion of the fixing member, and thus rotation of the fixing member is prevented. Because of this, the fixing member fixing the fixing shaft to the first nail support member is prevented from being easily loosened.

In accordance with another aspect of the present invention, a female threaded portion is formed on the tip portion of the fixing shaft. The fixing member is a fixing bolt that is attached to the female threaded portion and includes a non-circular head as the non-circular potion. In this case, rotation of the fixing bolt is prevented by the anti-rotation member.

In accordance with yet another aspect of the present invention, a male threaded portion is formed on the tip portion of the fixing shaft. The fixing member is a fixing nut that is attached to the male threaded portion and includes a non-circular outer peripheral side surface as the non-circular side surface. In this case, rotation of the fixing nut is prevented by the anti-rotation member.

In accordance with still another aspect of the present invention, the anti-rotation member is an anti-rotation bolt for preventing rotation of the fixing member. The anti-rotation member is also allowed to be screwed into the first bail support member. Furthermore, the first bail support member includes a screw hole that the anti-rotation bolt is screwed, and the screw hole is arranged for allowing the screwed anti-rotation bolt to make contact with the outer peripheral surface of the non-circular head portion.

In this case, rotation of the fixing member is prevented by a generally-commercial bolt. Therefore, cost for the anti-rotation member will be reduced.

According to another aspect of the present invention, the anti-rotation bolt is a set screw. In this case, rotation of the fixing member is prevented by the set screw. Accordingly, a space for the anti-rotation member does not have to include a space necessary for the head portion to be used for a general set screw. In other words, it is not necessary to form the first bail support member in a large size even if the anti-rotation member is arranged in the first bail support member. Furthermore, the set screw is a slotted set screw. Accordingly, even if a small sized set screw is used, deformation of the screw will be inhibited when screwed with a tool.

According to yet another aspect of the present invention, the first bail support member has a non-circular recess on its surface. In addition, the non-circular shaped recess is capable of accommodating the non-circular head portion and the anti-rotation bolt. Also, the screw hole is formed in the non-circular shaped recess.

In this case, the head portion of the fixing member and the anti-rotation bolt are accommodated in the non-circular shaped recess. In other words, they are not protruded from the outer surface of the first bail support member. Accordingly, even if the fishing line is slacked, the fishing line does not easily get stuck on the outer surface of the first bail support member.

According to still another aspect of the present invention, the first bail support member includes a further screw hole in the non-circular recess. The screw holes formed in the non-circular recess are separated from each other and are arranged at the same distance from the center of the fixing member. For example, it is possible to use a fixing member having a regular polygonal (e.g., hexagonal or octagonal) non-circular portion. In this case, if the central angel formed by the center of the fixing member and the centers of the screw bolts is configured to be different from the central angle formed by the center of the fixing member and each side of the regular polygon, a plurality of portions (i.e., phases) of the regular polygonal non-circular head portion are capable of making contact with the anti-rotation bolt. In other words, it is possible to prevent rotation of the fixing member in some phases.

According to yet another aspect of the present invention, the fishing line guiding mechanism further includes a second bail support member and a bail. The second bail support member is pivotally mounted to the second rotor arm. The bail couples the fixing shaft cover and the second bail support member.

In this case, a bail is provided in the fishing line guiding mechanism. Therefore, the fishing line will be easily guided to the line roller after casting.

According to another aspect of the present invention, the non-circular shaped head portion is a regular polygon with N-vertices (N is integer greater than or equal to 3 and less than or equal to 10). In addition, the non-circular shaped head portion includes a tool interlocking portion on its tip surface for interlocking a tool.

In this case, it is possible to use a commercial bolt member as the fixing member. Therefore, cost for the fixing member will be reduced.

According to yet another aspect of the present invention, the non-circular shaped head portion includes anti-rotation recesses. Specifically, the lateral sides of the non-circular head portion (i.e., the sides of the regular polygon with N-vertices) include an anti-rotation recess, respectively. The anti-rotation recesses are concave shaped surfaces for engaging with the outer peripheral surface of the anti-rotation member.

In this case, the outer peripheral surface of the anti-rotation member is engaged with the anti-rotation recesses of the non-circular head portion. Accordingly, rotation of the fixing member is reliably prevented.

According to the present invention, the anti-rotation member makes contact with the outer peripheral surface of the non-circular head portion of the fixing member, and thus rotation of the fixing member is prevented. Accordingly, the fixing member fixing the fixing shaft to the first bail support member will not be easily loosened.

These features, aspects and advantages of the present invention will become apparent to those skilled in the art from the following detailed description, which, taken in conjunction with the annexed drawings, disclose embodiments of the present invention.

BRIEF DESCRIPTION OF THE DRAWINGS

Referring now to the attached drawings which form a part of this original disclosure.

DETAILED DESCRIPTION OF THE EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
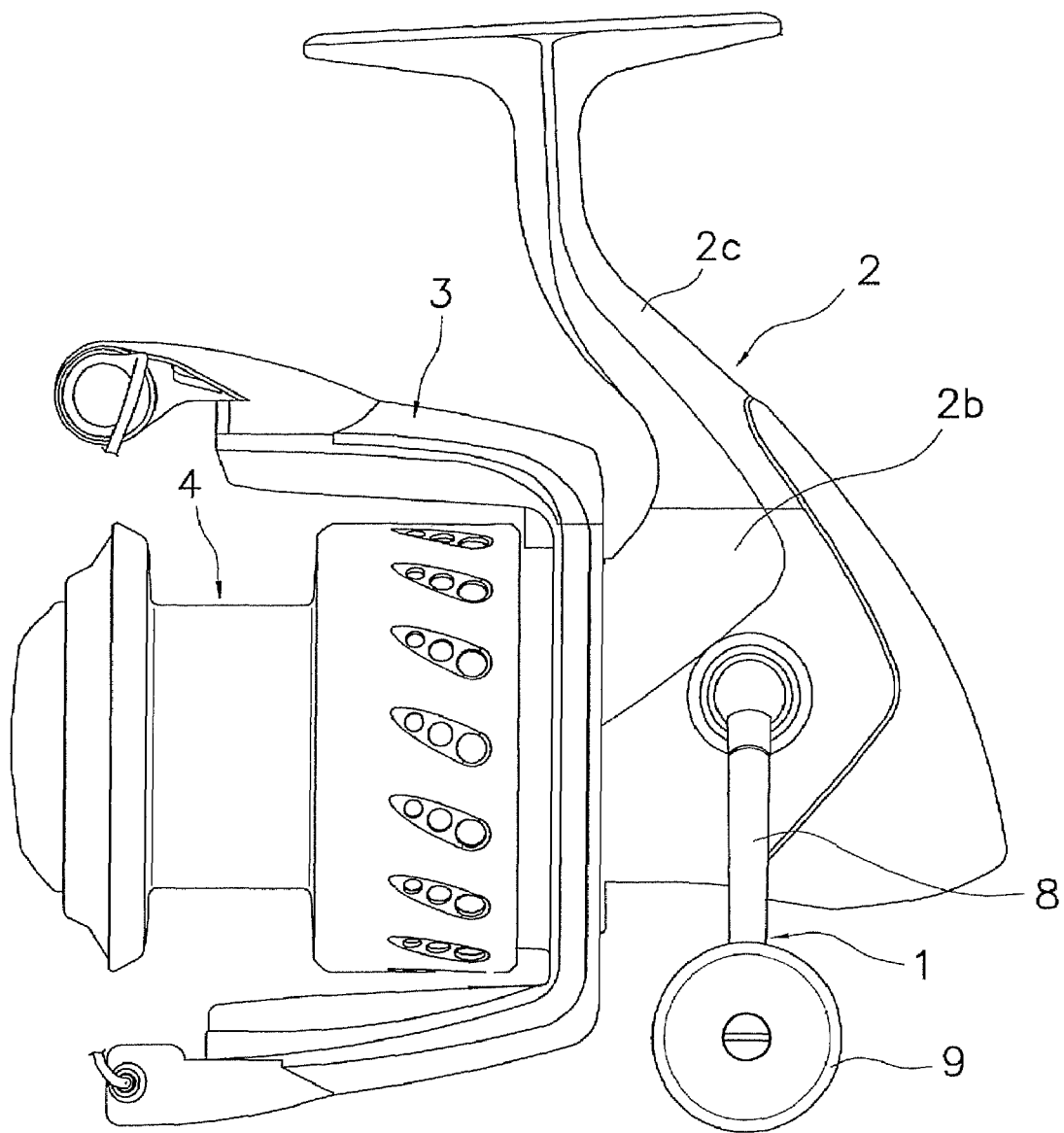
FIG. 1 is a lateral view of a spinning reel of an embodiment of the present invention.
Figure 2:
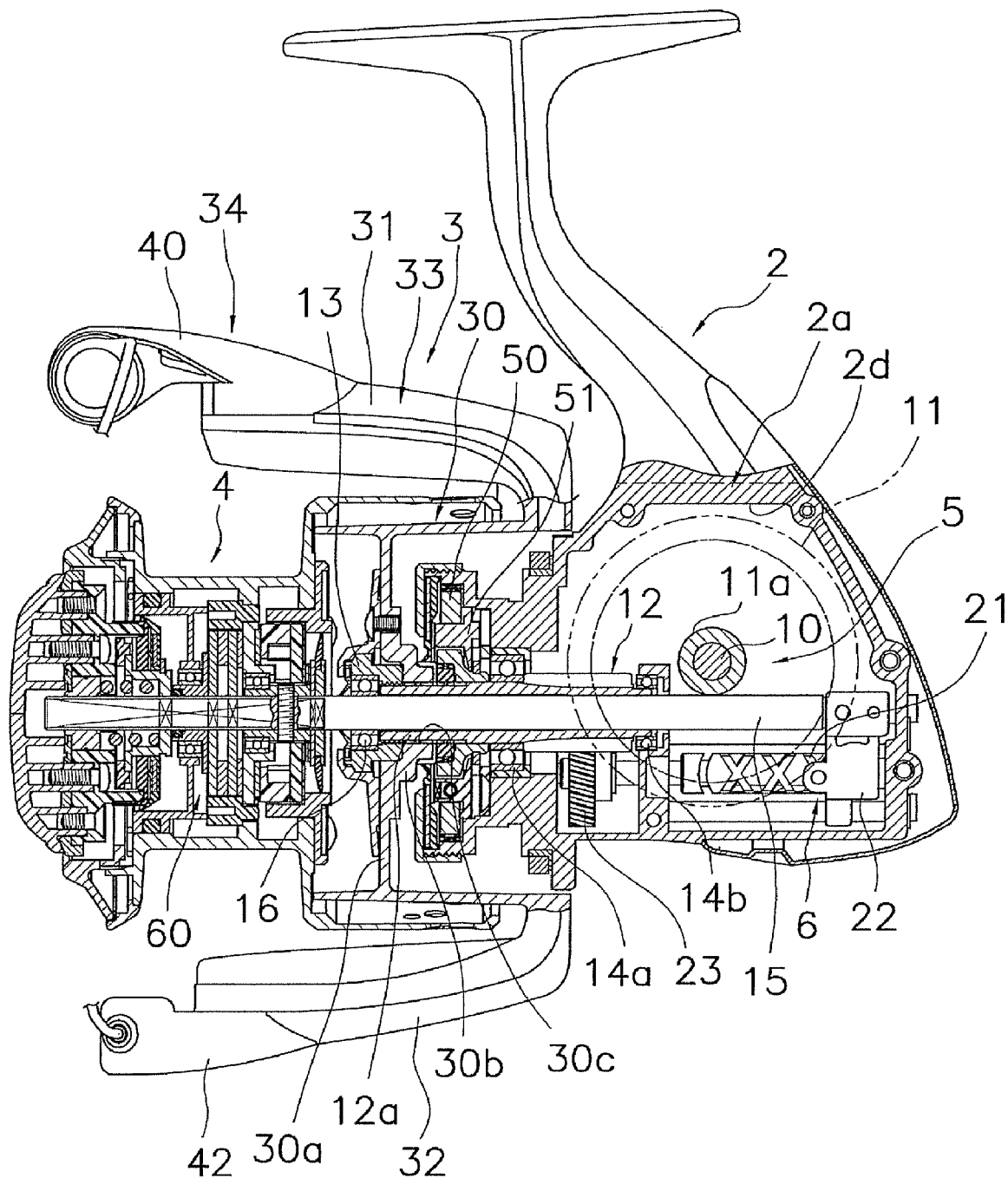
FIG. 2 is a lateral cross sectional view of the spinning reel.

Referring initially to FIGS. 1 and 2, a spinning reel is illustrated in accordance with an embodiment of the present invention. The spinning reel includes a reel unit 2, a rotor 3, and a spool 4. The reel unit 2 rotatably supports a handle assembly 1. The rotor 3 is rotatably supported in front of the reel body 2 and winds a fishing line around the spool 4. The spool 4 is arranged in front of the rotor 3 and is capable of moving back and forth. The fishing line is wound around the outer surface of the spool 4. Note that it is possible to attach the handle assembly 1 to either the left side (see FIG. 1) or the right side of the reel unit 2.

As illustrated in FIG. 1, the handle assembly 1 includes a handle arm 8 and a handle knob 9. The handle arm 8 is mounted to the tip of a handle shaft 10. The handle knob 9 is mounted to the tip of the handle arm 8.

Configuration of Handle Knob

Figure 3:
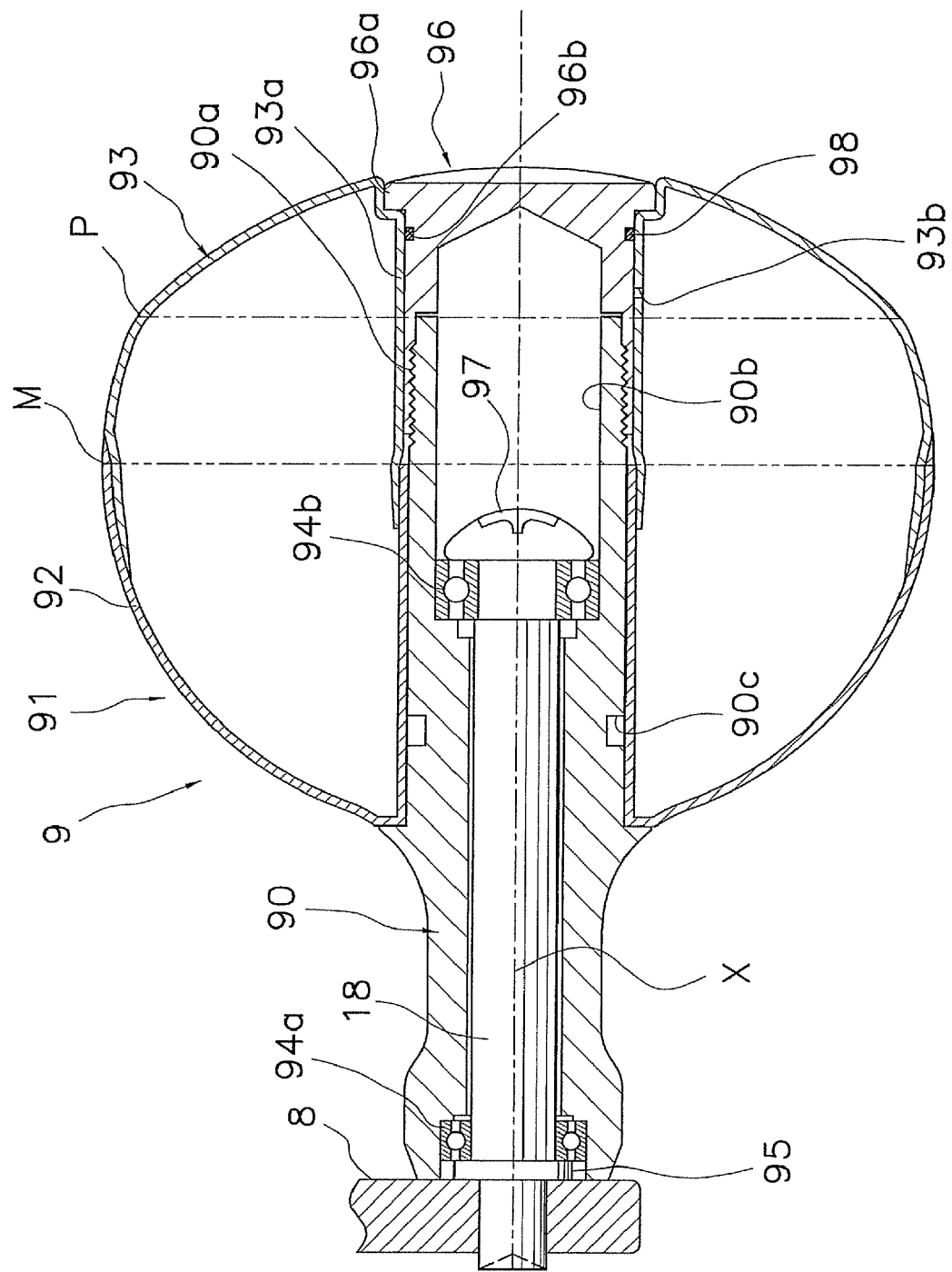
FIG. 3 is a cross sectional view of a handle knob.

As illustrated in FIG. 3, the handle knob 9 is rotatably attached to a knob shaft 18. Here, the knob shaft 18 is fixed to the tip of the handle arm 8 with caulking. A large diameter portion 95 is formed on the base end portion of the knob shaft 18 for axially positioning the knob shaft 18 and for fixing the handle knob 9.

The handle knob 9 includes a tubular mounting portion 90 and an approximately spherical knob portion 91. The mounting portion 90 is mounted to the outer peripheral side of the knob shaft 18. The knob portion 91 is fixed to the outer peripheral surface of the mounting portion 90 with adhesion. The mounting portion 90 is made of metal, e.g., stainless alloy or aluminum alloy. A pair of bearings 94a and 94b is mounted to the inner peripheral part of the mounting portion 90 for rotatably supporting the handle knob 9 with the knob shaft 18. The bearings 94a and 94b are axially separated from each other. A male threaded portion 90a is formed on the outer peripheral surface of the tip of the mounting portion 90 for fixing a cap 96. Also, a retaining bolt 97 is screwed into the tip of the knob shaft 18 for retaining the handle knob 9 with respect to the knob shaft 18. A mounting hole 90b is formed in the tip of the mounting portion 90 for mounting the bearing 94b. The retaining bolt 97 retains the mounting portion 90 with respect to the knob shaft 18 in the mounting hole 90b through the bearing 94b. For example, an annular shaped bond accumulating portion 90c is formed on a part of the mounting portion 90 that the knob portion 91 is bonded.

The knob portion 91 is a thin walled hollow member made of carbon fiber reinforced resin. The knob portion 91 includes a first knob 92 and a second knob 93. The first knob 92 is arranged on the near side of the handle arm 8. The outer peripheral surface of the first knob 92 is formed in an approximately spherical shape. The second knob 93 is arranged on the opposite side of the handle arm 8. The outer peripheral surface of the second knob 93 is formed in an approximately spherical shape. A part of the outer peripheral surface of the second knob 93 has diameter greater than that of the outer peripheral surface of the first knob 92. The inner peripheral surface of the first knob 92 is formed in a tubular shape and is bonded to the outer peripheral surface of the mounting portion 90. The first and second knobs 92 and 93 are integrally bonded while vicinity of the outermost diameter portion M of the outer periphery of the knob portion 91 is overlapped with vicinity of the outer most diameter portion M of the inner periphery of the knob portion 91 at approximately the same axial position. The first knob 92 is formed in a spherical shape while a remote position from the axis X of the knob shaft 18 is set as the center of the sphere.

The outer peripheral surface of the second knob 93 includes a part formed in a spherical shape with the same radius as that of the first knob 92. This part corresponds to a region ranging from a joint part with the first knob 92 to Point P on the near side of the cap 96. Also, the outer peripheral surface of the second knob 93 includes a part formed in a spherical shape with greater radius than that of the knob 92. This part corresponds to a region ranging from the Point P to a part that the cap 92 is attached. The inner peripheral surface of the second knob 93 is formed in a tubular shape. A slight gap is generated between the inner peripheral surface of the second knob 93 and the outer peripheral surface of the cap 96. A drain hole 93b is formed in the inner peripheral portion 93a of the second knob 93. When the cap 96 is attached, the drain hole 93b is covered with the cap 96. Thus, water does not easily enter the drain hole 93b. The large diameter spherical portion of the second knob 93 is formed in a spherical shape while the axis X is set as the center of the sphere.

The cap 96 is a tubular member with a brim 96a and is made of aluminum alloy. A sealing part 98 is mounted between the cap 96 and the inner peripheral portion 93a of the second knob 93 for preventing liquid from entering the knob portion 91. For example, the sealing part 98 is an O-ring. An annular groove 96b is formed on the cap 96, and the sealing part 98 is mounted to the annular groove 96b. The annular groove 96b is arranged closer to the brim 96a than to the drain hole 93b.

As illustrated in FIGS. 1 and 2, the reel unit 2 includes a reel body 2a, a lid member 2b, and a rod attachment leg 2c. For example, the reel body 2a is made of aluminum alloy, and includes an opening 2d. For example, the lid member 2b is made of aluminum alloy. The lid member 2b is detachably mounted to the reel body 2a, and covers the opening 2d. The rod attachment leg 2c is extended obliquely forward and upward from the reel body 2a. The reel body 2a includes a space in its interior. The space accommodates a rotor driving mechanism 5 and an oscillating mechanism 6. The rotor driving mechanism 5 rotates the rotor 3 in conjunction with rotation of the handle assembly 1. The oscillating mechanism 6 moves the spool 4 back and forth for uniformly rewinding the fishing line.

As illustrated in FIG. 2, the rotor driving mechanism 5 includes a main gear 11 and a pinion gear 12. The main gear 11 rotates with a main gear shaft 11a. The handle shaft 10 of the handle assembly 1 is fixed to the main gear shaft 11a. The pinion gear 12 meshes with the main gear 11. The pinion gear 12 is formed in a tubular shape. A front portion 12a of the pinion gear 12 penetrates the center part of the rotor 3 and is fixed to the rotor 3 with a nut 13. The axial intermediate portion and the axial rear end portion of the pinion gear 12 are rotatably supported in the reel body 2a with bearings 14a and 14b. The bearings 14a and 14b are mounted to the reel body 2a, and are separated from each other.

A spool shaft 15 is coupled to the center part of the spool 4 through a drag mechanism 60. The oscillating mechanism 6 moves the spool shaft 15 back and forth for moving the spool 4 in the same direction. The oscillating mechanism 6 includes a worm shaft 21, a slider 22, and an intermediate gear 23. The worm shaft 21 is arranged below and in parallel to the spool shaft 15. The slider 22 moves back and forth along the worm shaft 21. The intermediate gear 23 is fixed to the tip of the worm shaft 21. The rear end of the spool shaft 15 is non-rotatably fixed to the slider 22. The intermediate gear 23 meshes with the pinion gear 12.

The spool shaft 15 penetrates the center part of the pinion gear 12. The oscillating mechanism 6 reciprocates the spool shaft 15 back and forth in the interior of the pinion gear 12. The intermediate portion of the spool shaft 15 is supported by a bearing 16 mounted to the inner side of the nut 13. The rear portion of the spool shaft 15 is supported by the inner peripheral surface of the rear portion of the pinion gear 12. Thus, the spool shaft 15 is capable of rotating and axially moving. The electrolysis Ni plating is performed with respect to the surface of the spool shaft 15. This prevents the spool shaft 15 from biting into the pinion gear 12 when the spool shaft 15 moves back and forth while relatively rotating with the pinion gear 12. Interlocking surfaces 15a and male threaded portions 15b are formed on the tip of the spool shaft 15. The interlocking surfaces 15a are formed in parallel with each other. The interlocking surfaces 15a are used for preventing rotation of members to be mounted to the surfaces 15a. The male threaded portions 15b are used for drag regulation.

Configuration of Rotor

As illustrated in FIG. 2, the rotor 3 includes a rotor body 33 and a bail arm 34. The rotor body 33 includes a coupling part 30, a first rotor arm 31 and a second rotor arm 32. The coupling part 30 is formed in a tubular shape. The first and second rotor arms 31 and 32 are arranged lateral to the coupling part 30, and are opposed to each other. The bail arm 34 is an example of a fishing line guiding mechanism. The bail arm 34 is mounted to the rotor body 33 and is capable of pivoting. The coupling part 30 and the first and second rotor arms 31 and 32 thus make up the rotor 3. Also, these members 30, 31, and 32 are made of aluminum alloy, and are integrally formed.

A front wall 30a is formed in the front portion of the coupling part 30. A boss portion 30b is formed in the center part of the front wall 30a. A through hole 30c is formed in the center part of the boss portion 30b. The front portion 12a of the pinion gear 12 and the spool shaft 15 penetrate the through hole 30c. The nut 13 is arranged in front of the front wall 30a.

The first rotor arm 31 is extended forward from the coupling part 30 and is externally curved in a convex shape. The first rotor arm 31 is also expanded and curved in a circumferential direction of the coupling part 30. The second rotor arm 32 is extended forward from the coupling part 30 and is externally curved in a convex shape. Its coupling portion to the coupling part 30 is expanded and curved in the circumferential direction of the coupling part 30. Note that the second rotor arm 32 has an opening (not illustrated in the figure) for reducing its weight.

Configuration of Bail Arm

The bail arm 34 is mounted to the tips of the first and second rotor arms 31 and 32. The bail arm 34 is capable of pivoting between the line releasing posture and the line winding posture. The bail arm 34 is biased by means of a bail flipping mechanism (not illustrated in the figure) and is accordingly set to be either the line releasing posture or the line winding posture.

Figure 4:
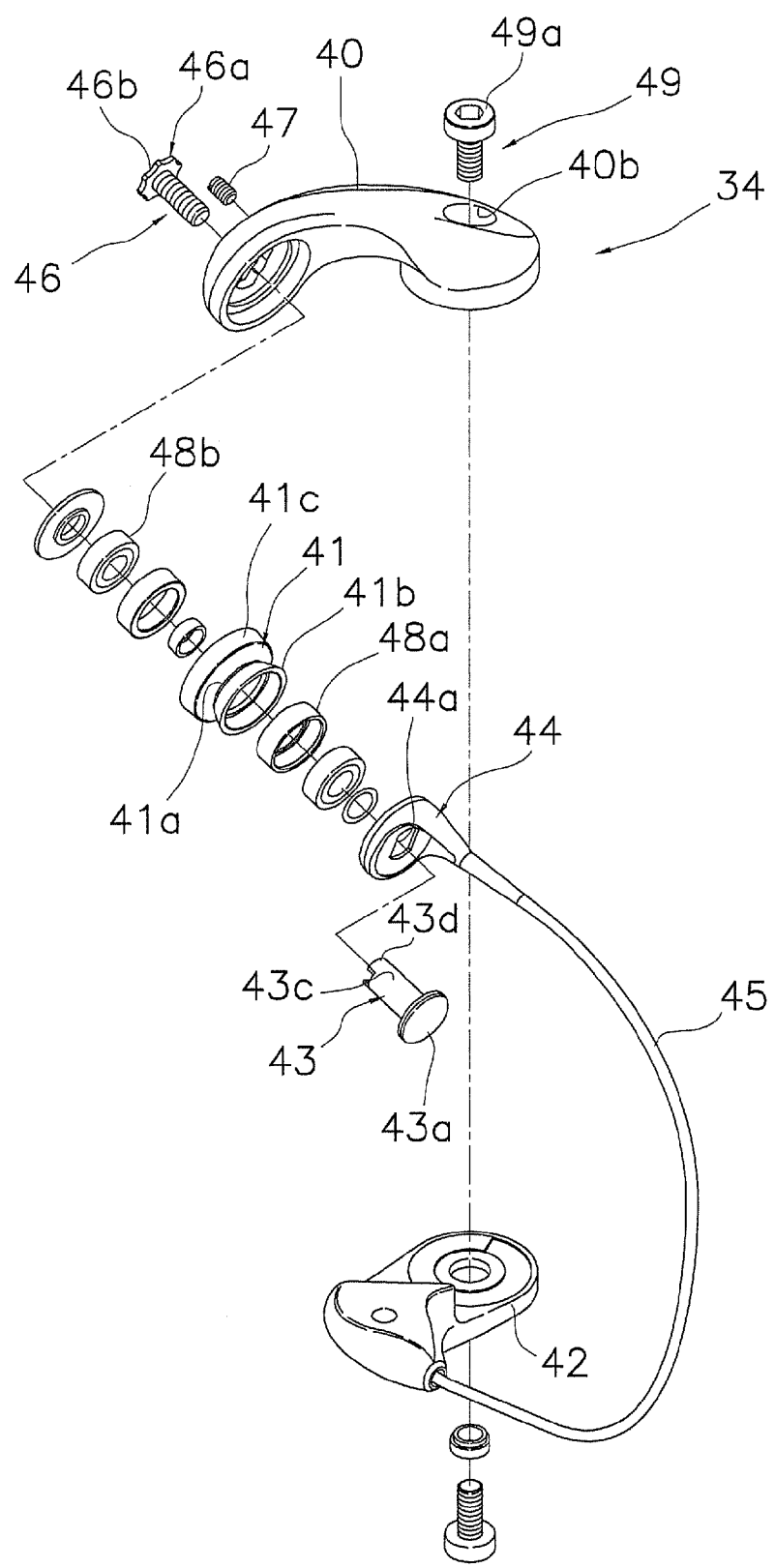
FIG. 4 is an exploded perspective view of a bail arm.

As illustrated in FIGS. 2 and 4, the bail arm 34 includes a first bail support member 40 and a second bail support member 42. The first bail support member 40 is mounted to the outer peripheral side of the tip of the first rotor arm 31 and is capable of pivoting. The second bail support member 42 is mounted to the outer peripheral side of the tip of the second rotor arm 32 and is capable of pivoting. Also, the bail arm 34 includes a line roller 41. The line roller 41 is mounted to the tip of the first bail support member 40. Furthermore, the bail arm 34 includes a fixing shaft 43, a fixing shaft cover 44, and a bail 45. The fixing shaft 43 is fixed to the tip of the first bail support member 40 and is cantilevered by the first bail support member 40. The fixing shaft cover 44 is arranged on the tip side of the fixing shaft 43. The bail 45 couples the fixing shaft cover 44 and the second bail support member 42. Also, the bail arm 34 includes a fixing bolt 46 and an anti-rotation member 47. The fixing bolt 46 fixes the fixing shaft 43 to the first bail support member 40. The anti-rotation member 47 prevents rotation of the fixing bolt 46.

Figure 5:
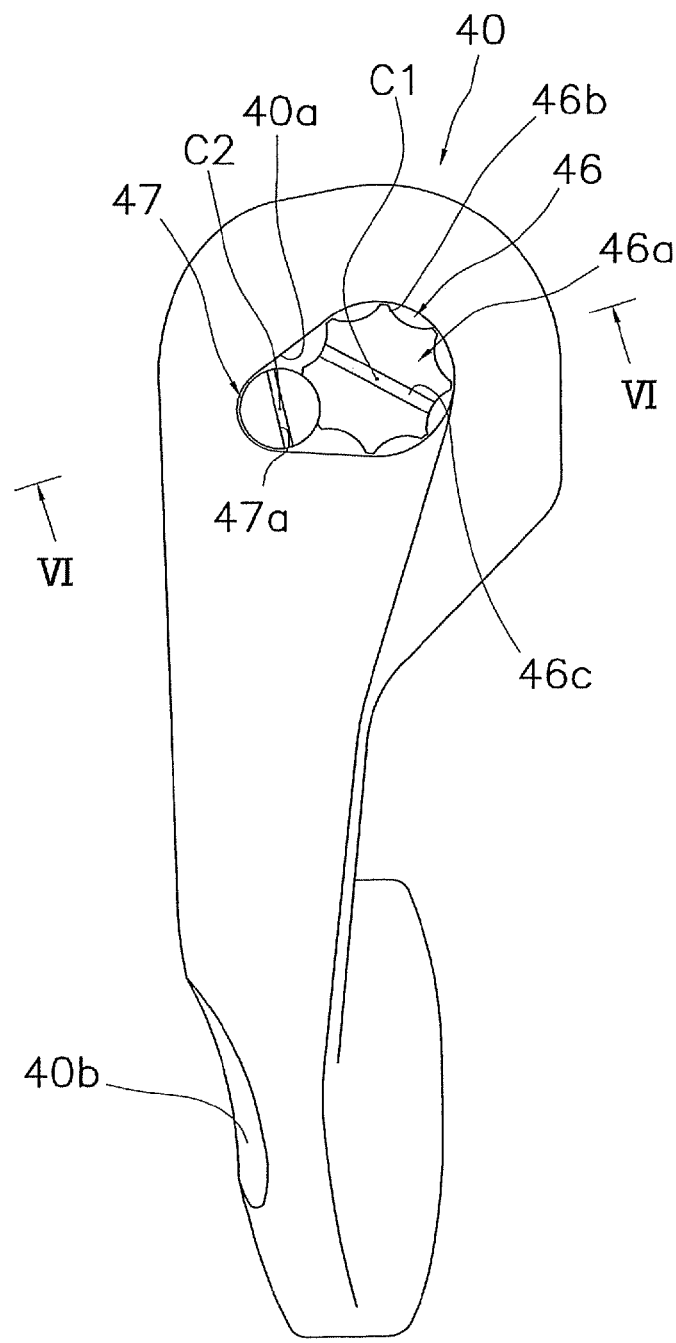
FIG. 5 is plan view of a first bail support member.
Figure 6:
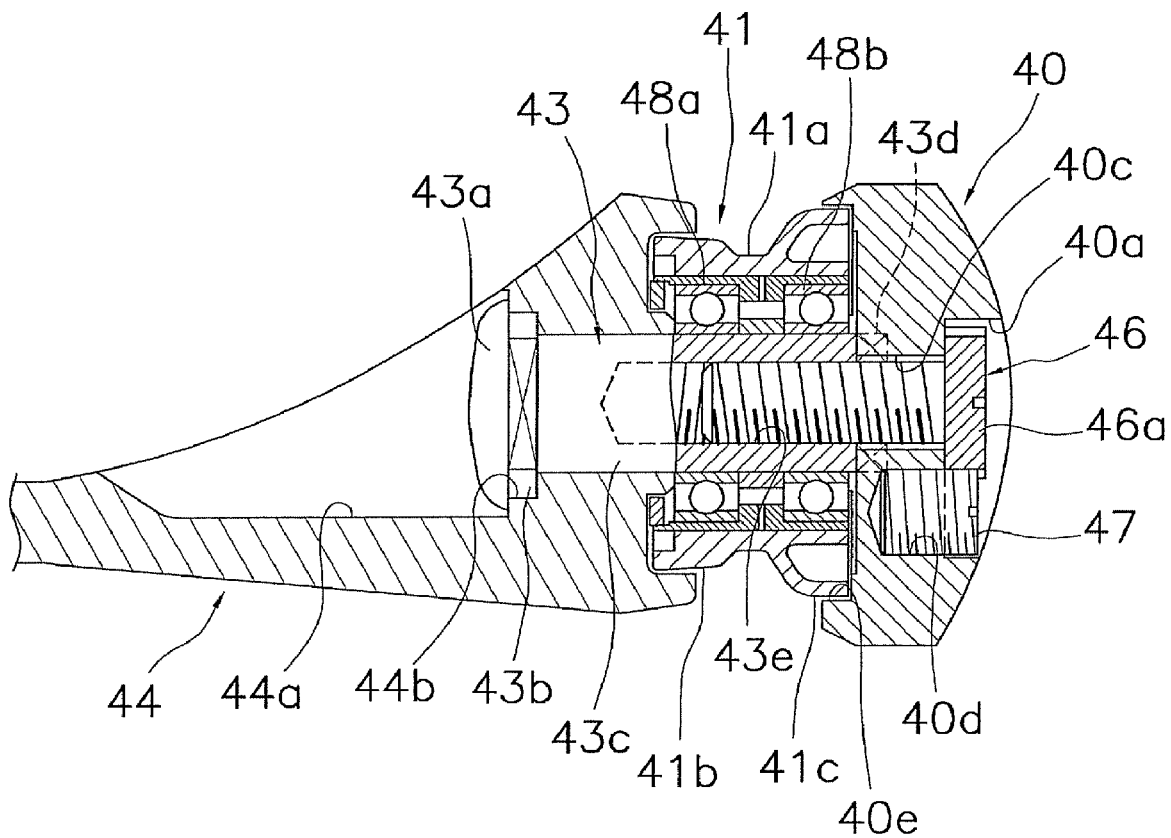
FIG. 6 is an enlarged cross-sectional view of the bail arm in the vicinity of a fixing shaft cover.

As illustrated in FIGS. 4 to 6, the first bail support member 40 is a member made of aluminum alloy. The outer surface of the first bail support member 40 is covered with a metal film such as chrome plating. The chrome plating hardens the surface of the first bail support member 40, and accordingly, the outer surface is protected from being scratched when contacted by the fishing line. A first accommodation recess 40a (an example of a non-circular recess) is formed on the front end side of the outer surface of the first bail support member 40. A head portion 46a (an example of a non-circular head portion) of the fixing bolt 46 is accommodated in the first accommodation recess 40a. On the other hand, a second accommodation recess 40b is formed on the base end side of the first bail support member 40. The second accommodation recess 40b is formed in a circular shape, and accommodates a head portion 49a of an attachment bolt 49. The attachment bolt 49 is used for attaching the first bail support member 40 to the first rotor arm 31. The first accommodation recess 40a is a cavity that has an approximately raindrop shape. Here, the raindrop shape is formed by connecting theoretical large and small circles. A through hole 40c is formed in Center C1 of the theoretical large diameter circle in the first accommodation recess 40a. The fixing bolt 46 penetrates the through hole 49c. On the other hand, a screw hole 40d is formed in Center C2 of the theoretical small diameter circle in the first accommodation recess 40a. The anti-rotation member 47 is screwed into the screw hole 40d. Furthermore, a circular shaped third accommodation recess 40e is formed on the inner surface of the first bail support member 40. The line roller 41 is arranged in the third accommodation recess 40e.

The fixing shaft 43 is separately formed from the fixing shaft cover 44. The fixing shaft 43 is provided for fixing the fixing shaft cover 44 to the first bail support member 40 and for rotatably supporting the line roller 41. The fixing shaft 43 includes a head portion 43a, a first interlocking portion 43b, a support portion 43c, and a second interlocking portion 43d. The head portion 43a has large diameter. The first interlocking portion 43b is continuously formed from the head portion 43a, and has diameter less than that of the head portion 43a. The support portion 43a supports the line roller 41. The second interlocking portion 43d is formed on the tip of the support portion 43c. A female threaded portion 43e is formed in the tip portion of the fixing shaft 43. The fixing bolt 46 is screwed into the female threaded portion 43e. The first interlocking portion 43b is interlocked with the fixing shaft cover 44. The second interlocking portion 43d is interlocked with the first bail support member 40. Thus, the interlocking states prevent rotation of the fixing shaft cover 44, the fixing shaft 43, and the first bail support member 40.

The fixing bolt 46 includes the non-circular shaped head portion 46a. In the present embodiment, the head portion 46a includes eight anti-rotation recesses 46b. The anti-rotation recesses 46b (i.e., sides of the octagon) are concave shaped surfaces. The anti-rotation member 47 is capable of engaging with the anti-rotation recesses 46b. Therefore, the center of the circular arc substantially corresponds to Center C2 of the theoretical small diameter circle (i.e., the center of the anti-rotation member 47). A slit 46c (an example of a tool interlocking portion) is formed on the surface of the head portion 46a. A tool (e.g., driver) is interlocked with the slit 46c along the diameter of the head portion 46a. When the fixing shaft 43 is fixed by the fixing bolt 46, the fixing bolt 46 is fastened to a position that the anti-rotation recess 46b is capable of being engaged with the anti-rotation member 47.

The anti-rotation member 47 is, for example, a screw. Preferably, the anti-rotation member 47 is a set screw with a slot 47a formed in its end, i.e. a slotted set screw. The anti-rotation member 47 is screwed into the screw hole 40d and reaches the bottom portion of the screw hole 40*d*. Thus the anti-rotation member 47 is fixed to the first accommodation recess 40*a*.

In this case, it is possible to prevent rotation of the fixing bolt 46 by the set screw. Accordingly, the space for arranging the anti-rotation member 47 does not have to include a space necessary for arranging the head portion of the set screw. In other words, it is not necessary to form the first bail support member in a large size even if the anti-rotation member 47 is arranged in the first bail support member. In addition, the set screw is not a screw with hexagonal hole but a screw with a slit. Therefore, even if a small set screw is used and is screwed by a tool, deformation of the screw will be inhibited.

Also, the fixing shaft 43 is fixed to the first bail support member 40 by means of the fixing bolt 46 with the non-circular head portion 46*a*. The line roller 41 is rotatably supported by the fixing shaft 43, and guides the fishing line to the spool 4. In this case, the anti-rotation member 47 makes contact with the outer peripheral surface of the non-circular head portion 46*a* of the fixing bolt 46, and thus rotation of the fixing bolt 46 is prevented. Therefore, the fixing bolt 46 for fixing the fixing shaft 43 to the first bail support member 40 is not easily loosened. Accordingly, it is possible to inhibit a trouble originated from the loosening of the fixing bolt 46 (e.g., wobbling of the line roller 41). If the line roller 41 is wobbled or its position becomes unstable in a spinning reel, this makes the fishing line twisted or stuck.

As illustrated in FIG. 4, the bail 45 is curved in an approximately U-shape, and the fixing shaft cover 44 is integrally formed with the bail 45 by a predetermined method (e.g., forging). A mounting recess 44*a* is formed in the fixing shaft cover 44, and the fixing shaft 43 is allowed to be mounted to the mounting recess 44*a*. In addition, a slot 44*b* is formed on the bottom portion of the mounting recess 44*a*, and the first interlocking portion 43*b* is interlocked with the slot 44*b*. The tip of the bail 45 is fixed to the second bail support member 42 by caulking.

The line roller 41 is rotatably supported by the fixing shaft 43 through the bearings 48*a* and 48*b* axially separated from each other. The line roller 41 includes a first tubular portion 41*b* and a second tubular portion 41*c*. In addition, a small diameter guide groove 41*a* is formed in the axially center part of the line roller 41. The guide groove 41*a* is interposed between the first and second tubular portions 41*b* and 41*c*. A part of the first tubular portion 41*b* is inserted into the fixing shaft cover 44. The diameter of the first tubular portion 41*b* is less than that of the second tubular portion 41*c*. A part of the second tubular portion 41*c* is inserted into the circular shaped third accommodation recess 40*e* formed on the tip of the first bail support member 40. A variety of members (e.g., collar, spacer, or washer) are mounted in the interior of the line roller 41 for mounting the bearings 48*a* and 48*b*.

As illustrated in FIG. 2, an anti-reverse rotation mechanism 50 is arranged in the interior of the coupling part 30 of the rotor 3 for prohibiting reverse rotation of the rotor 3. The anti-reverse rotation mechanism 50 includes a roller type one-way clutch 51. Here, an inner ring of the one-way clutch 51 idles. The anti-reverse rotation mechanism 50 constantly prevents reverse rotation of the rotor 3 from the line releasing direction to the line winding direction. The anti-reverse rotation mechanism 50 never allows the rotor 3 to reversely rotate.

Configuration of Spool

Figure 7:
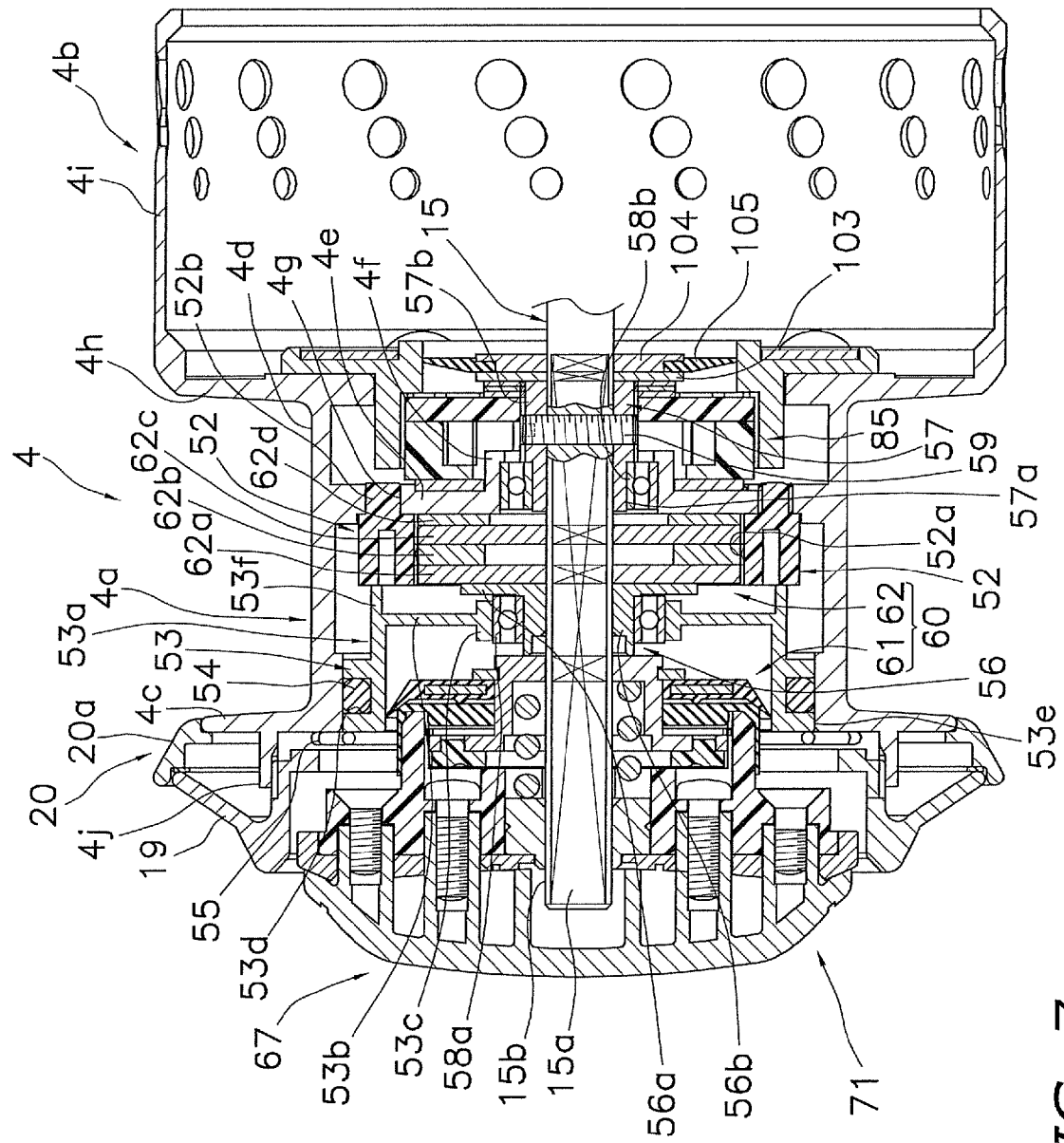
FIG. 7 is a cross sectional view of a spool.

As illustrated in FIG. 2, the spool 4 is arranged between the first and second rotor arms 31 and 32 of the rotor 3 and is mounted to the tip of the spool shaft 15. As illustrated in FIG. 7, the spool 4 includes a bobbin trunk 4*a*, a skirt portion 4*b*, and a front flange portion 4*c*. For example, the bobbin trunk 4*a* is made of aluminum alloy, and the fishing line is wound around the outer periphery of the bobbin trunk 4*a*. The skirt portion 4*b* is integrally formed on the rear portion of the bobbin trunk 4*a*. The front flange portion 4*c* is integrally formed on the front end of the bobbin trunk 4*a*. The spool 4 accommodates the drag mechanism 60 and a drag sound generation mechanism 85. The drag mechanism 60 brakes the spool 4 by applying the preliminarily configured drag force to the spool 4. The drag sound generation mechanism 85 generates sounds when drag is activated.

The bobbin trunk 4*a* is a cylindrical member. Its outer peripheral surface is arranged in parallel to the spool shaft 15. The bobbin trunk 4*a* includes a tubular portion 4*d*, a support wall portion 4*e*, and a shaft support portion 4*f*. The fishing line is wound around the tubular portion 4*d*. The support wall portion 4*e* is formed in a disk shape and is integrally formed with the inner peripheral surface of the tubular portion 4*d*. The shaft support portion 4*f* is formed in a tubular shape and is formed on the inner peripheral side of the support wall portion 4*e*.

The skirt portion 4*b* includes a rear flange portion 4*h* and a cylindrical portion 4*i*. The rear flange portion 4*h* is radially extended from the rear end of the bobbin trunk 4*a*. The cylindrical portion 4*i* is formed in a tubular shape and is extended backward from the outer peripheral side of the rear flange portion 4*h*. The coupling part 30 of the rotor 3 is arranged on the inner side of the cylindrical portion 4*i*.

A metal spool ring 20 is mounted on the outer peripheral surface of the front flange portion 4*c* for smoothly releasing the fishing line from the bobbin trunk 4*a*. The spool ring 20 includes a sloped surface 20*a*. The sloped surface 20*a* is gradually expanded toward its tip. The spool ring 20 is fixed to the front flange portion 4*c* by means of a ring fixing member 19. The ring fixing member 19 is screwed into a tubular shaped female threaded portion 4*j*. The female threaded portion 4*j* is protruded forward from the front flange portion 4*c*.

Figure 8:
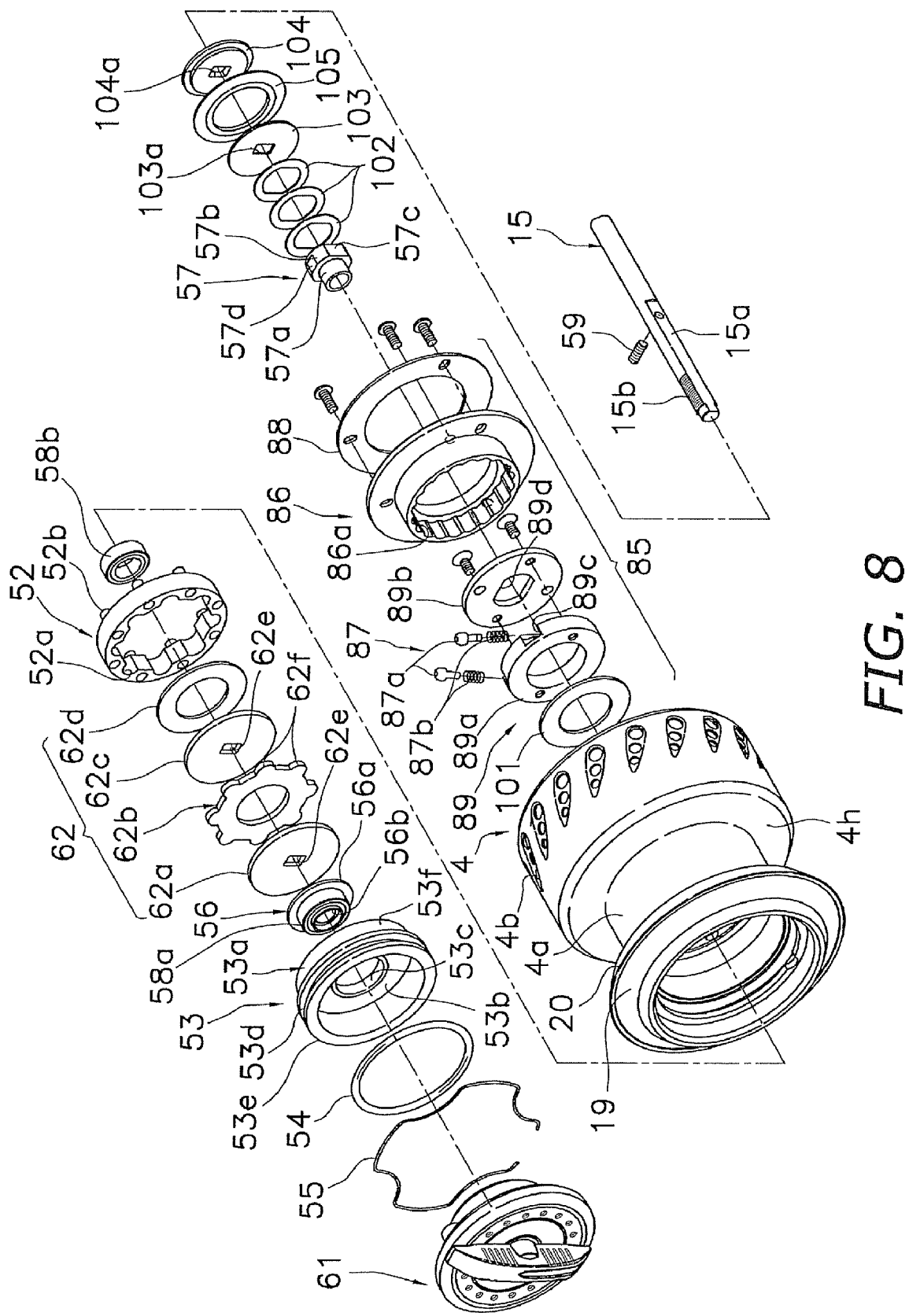
FIG. 8 is an exploded perspective view of the spool.

As illustrated in FIGS. 7 and 8, a drag accommodation tubular portion 52 is mounted in the interior of the bobbin trunk 4*a* and is capable of integrally rotating with the bobbin trunk 4*a*. The drag accommodation tubular portion 52 is arranged in front of the support wall portion 4*e*, and accommodates the drag mechanism 60. A support tubular portion 53 is mounted in front of the drag accommodation tubular portion 52. The support tubular portion 53 and the shaft support portion 4*f* rotatably support the spool 4 with respect to the spool shaft 15.

The drag accommodation tubular portion 52 accommodates an after-mentioned friction section 62 of the drag mechanism 60. The drag accommodation tubular portion 52 includes a plurality of (e.g., eight) interlocking recesses 52*a* on its inner peripheral surface. The interlocking recesses 52*a* are circumferentially separated from each other and each of them are formed in a semi circular shape. In addition, the drag accommodation tubular portion 52 includes a plurality of (e.g., four) engaging protrusions 52*b* on its rear surface. The engaging protrusions 52*b* are circumferentially separated from each other, and are engaged with a plurality of (e.g., four) engaging holes 4*g*. The engaging holes 4*g* are formed in the support wall portion 4*e* of the spool 4. With the structure, the drag accommodation tubular portion 52 and the spool 4 integrally rotate.

The support tubular portion 53 includes a mounting tubular portion 53*a*, a circular wall portion 53*b*, and a shaft support portion 53*c*. The mounting tubular portion 53*a* is fitted with the inner peripheral surface of the tubular portion 4*d* of the bobbin trunk 4*a*. The circular wall portion 53*b* is integrally formed with the inner peripheral surface of the mounting tubular portion 53a. The shaft support portion 53c is formed in a tubular portion and is arranged on the inner peripheral side of the circular wall portion 53b. Diameter of a front side outer peripheral surface 53e of the mounting tubular portion 53a is greater than that of a rear side outer peripheral surface 53f of the mounting tubular portion 53a. The front side outer peripheral surface 53e is fitted with the inner peripheral surface of the tubular portion 4d. An O-ring 54 is mounted to the front side outer peripheral surface 53e for preventing liquid entering members/parts behind the support tubular portion 53 from a gap between the tubular portion 4d and the support tubular portion 53. The O-ring 54 is mounted to an annular groove 53d formed on the front side outer peripheral surface 53e of the support tubular portion 53. The rear surface of the mounting tubular portion 53a makes contact with the front surface of the drag accommodation tubular portion 52. The support tubular portion 53 and the drag accommodation tubular portion 52 are retained together by a retaining spring 55. The retaining spring 55 is made up of a wire rod and is mounted to the interior of the spool 4. The retaining spring 55 is arranged in front of the support tubular portion 53. Also, the retaining spring 55 is held in a gap between the front surface of the bobbin trunk 4a and the rear surface of the ring fixing member 19 in the interior of the spool 4.

First and second support portions 56 and 57 are fitted onto the outer peripheral surface of the spool shaft 15. Two bearings 58a and 58b are mounted to the first and second support portions 56 and 57, respectively, for rotatably supporting the spool 4 with respect to the spool shaft 15. The first support portion 56 is rotatably mounted to the spool shaft 15. The first support portion 56 is a cylindrical member with a brim. The first support portion 56 includes a brim 56a and a tubular portion 56b with diameter less than that of the brim 56a. The first support portion 56 is arranged between a drag knob assembly 61 and the friction section 62, and makes contact with the drag knob assembly 61 and the friction section 62. The inner ring of the bearing 58a is fixed to the outer peripheral surface of the tubular portion 56b of the first support portion 56 by caulking. The outer ring of the bearing 58a is mounted to the shaft support portion 53c of the support tubular portion 53. With the structure, it is possible to easily retain the bearing 58a with respect to the outer peripheral surface of the tubular portion 56b of the first support portion 56.

The second support portion 57 is fixed to the rear portion of the interlocking surfaces 15a formed on the front side portion of the spool shaft 15. The second support portion 57 is a tubular member with small and large steps. Specifically, the second support portion 57 includes a small diameter portion 57a and a large diameter portion 57b. The inner ring of the bearing 58b is mounted to the small diameter portion 57a. The outer ring of the bearing 58b is mounted to the shaft support portion 4f of the bobbin trunk 4a. The large diameter portion 57b includes first interlocking surfaces 57c and second interlocking surfaces 57d. The first interlocking surfaces 57c are formed in parallel to each other. The second interlocking surfaces 57d are formed perpendicular to the first interlocking surfaces 57c. The second support portion 57 is non-rotatably fixed to the spool shaft 15 by means of a locking screw 59. Here, the locking screw 59 penetrates the first interlocking surfaces 57c. The locking screw 59 is a set screw, e.g. a slotted set screw. The locking screw 59 is screwed into a screw hole penetrating the interlocking surface 15a while penetrating the first interlocking surfaces 57c.

According to the support structure of the spool 4 with the above configuration, the support tubular portion 53 is provided in front of the support wall portion 4e of the bobbin trunk 4a, and the bearing 58a is arranged in the support tubular portion 53. Therefore, it is possible to axially more separate the bearings 58a and 58b, compared to a conventional configuration that two bearings are arranged in the shaft support portion 4f. Accordingly, the axial distance between two positions for supporting the spool 4 will be extended, and it is possible to inhibit wobbling of the spool 4.

Configuration of Drag Mechanism

As illustrated in FIGS. 7 and 8, the drag mechanism 60 applies the drag force to the spool 4 by braking rotation of the spool 4 in the line releasing direction. The drag mechanism 60 includes the drag knob assembly 61 and the friction section 62 (an example of a drag friction section). The drag knob assembly 61 is used when an angler manually regulates the drag force. For example, the friction section 62 includes four drag washers 62a to 62d. The drag washers 62a to 62d are pressed toward the spool 4 by the drag knob assembly 61, and accordingly the drag force is regulated.

Configuration of Drag Knob Assembly

Figure 9:
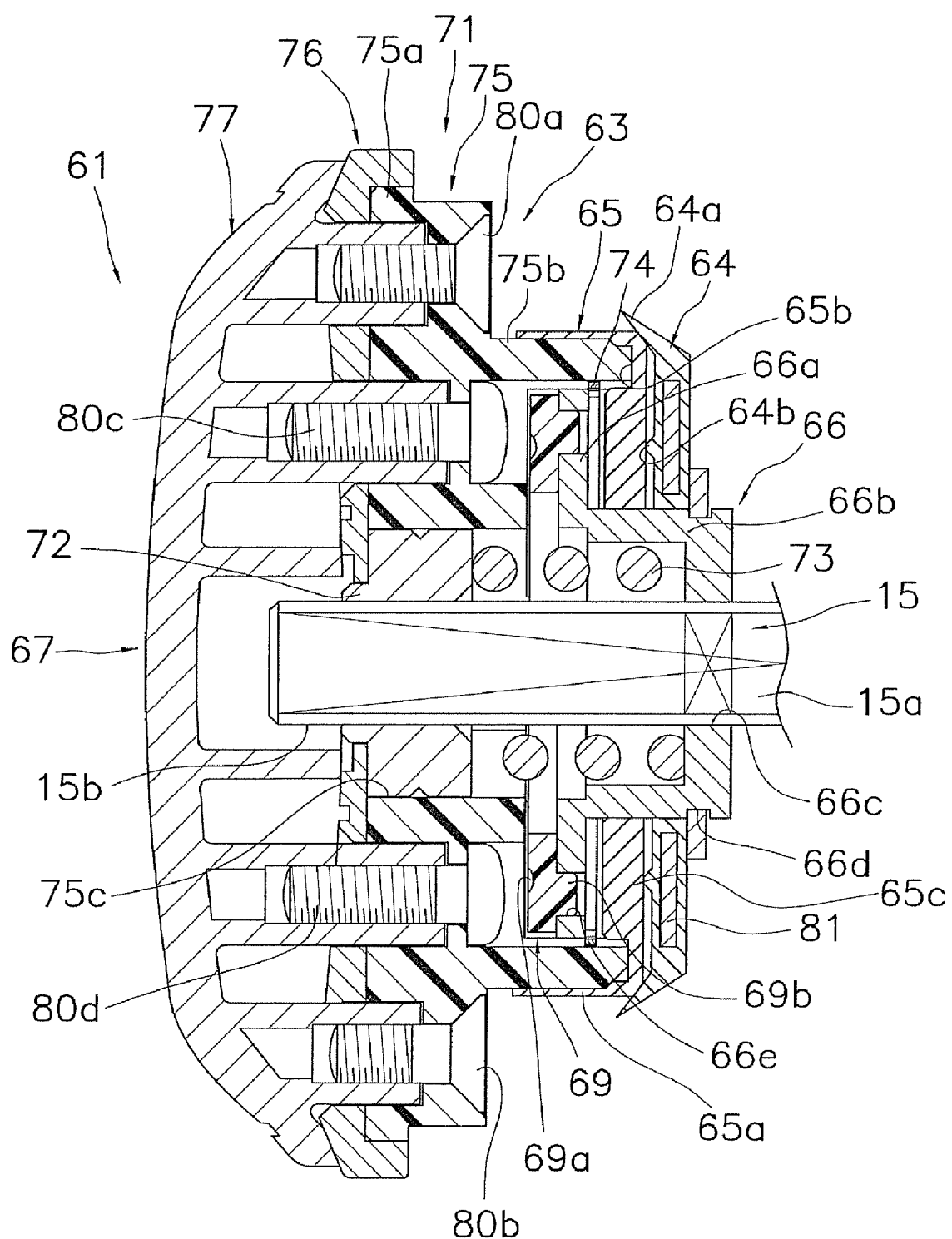
FIG. 9 is a cross sectional view of a drag knob assembly.
Figure 10:
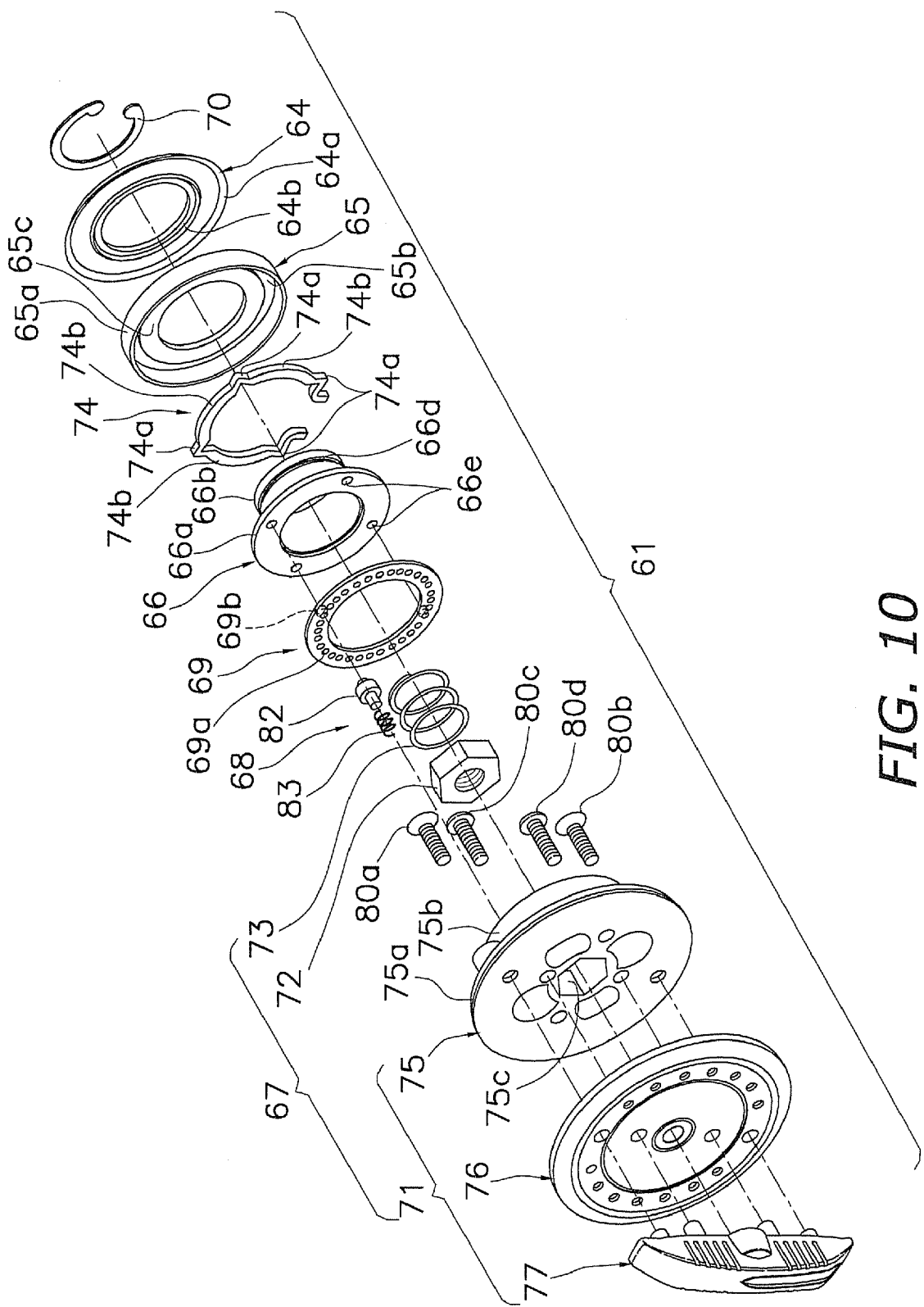
FIG. 10 is an exploded perspective view of the drag knob assembly.

As illustrated in FIGS. 9 and 10, the drag knob assembly 61 includes a knob section 63 and a first sealing member 64. The knob section 63 includes a first member 66 and a second member 67. The second member 67 relatively rotates with the first member 66. The first sealing member 64 seals a gap between the knob section 63 and the spool 4. In addition, the drag knob assembly 61 includes a second sealing member 65 and a knob sound generation mechanism 68 (see FIG. 10). The second sealing member 65 seals a gap between the first member 66 and the second member 67. The knob sound generation mechanism 68 generates sounds when the first member 66 and the second member 67 relatively rotate.

In addition to the first and second members 66 and 67, the knob section 63 further includes a coupling member 74. The coupling member 74 axially non-movably and rotatably couples the first and second members 66 and 67.

The first member 66 is a tubular member with a brim and is made of metal (e. g., aluminum alloy). Specifically, the first member 66 includes a ring shaped brim 66a and a cylindrical portion 66b with diameter less than that of the brim portion 66a. The first member 66 is non-rotatably and axially-movably mounted to the spool shaft 15. A sound generation disk 69 is arranged on the front end surface of the brim portion 66a and is capable of integrally rotating with the first member 66. The sound generation disk 69 forms a part of the knob sound generation mechanism 68.

The sound generation disk 69 is a member made of synthetic resin. A plurality of sound generation recesses 69a are formed on the front surface of the sound generation disk 69. The sound generation recesses 69a are circumferentially separated from each other. A plurality of coupling protrusions 69b are formed on the rear surface of the sound generation disk 69. The coupling protrusions 69b are fitted into a plurality of coupling holes 66e formed in the brim portion 66a. With the structure, the sound generation disk 69 is fixed to the first member 66 and its rotation is prevented.

An oval shaped interlocking slot 66c is formed in the inner peripheral part of the cylindrical portion 66b. The interlocking slot 66c is non-rotatably interlocked with the interlocking surfaces 15a of the spool shaft 15. An annular groove 66d is formed on the outer peripheral surface of the cylindrical portion 66b. The annular groove 66d is arranged behind the portion that the first sealing member 64 is mounted. The rear end surface of the cylindrical portion 66b makes contact with the drag washer 62a of the friction section 62 through the first support portion 56.

The second member 67 is opposed to the first member 66 and is capable of relatively rotating with the first member 66. The second member 67 is formed in a tubular shape, and protrudes toward the first member 66 for covering the brim portion 66a. The second member 67 is also screwed onto the spool shaft 15. The second member 67 includes a knob unit 71, a nut portion 72, and a spring member 73. The nut portion 72 is non-rotatably and axially-movably mounted to the knob unit 71 and is also screwed onto the spool shaft 15. The spring member 73 is a coil spring and is arranged between the nut portion 72 and the first member 66 in a compressed condition. The knob unit 71 includes a knob body 75. The knob body 75 is made of synthetic resin, and includes a disk portion 75a and a tubular shaped protruding portion 75b with diameter less than that of the disk portion 75a. In addition, the knob unit 71 includes a cover portion 76 and an operating knob 77. The cover portion 76 is made of metal and is formed in a disk shape. The cover portion 76 is fixed to the front surface of the knob body 75. The operating knob 77 is made of metal and is radially fixed to the front surface of the cover portion 76.

Four bolt members 80a to 80d are inserted from the rear side of the disk portion 75a of the knob body 75. The bolt members 80a to 80d penetrate the cover portion 76, and are screwed into the operating knob 77. With the structure, the cover portion 76 and the operating knob 77 are fixed to the knob body 75.

The protruding portion 75b is formed in a tubular shape, and protrudes toward the first member 66 for covering the brim portion 66a of the first member 66. The brim portion 66a is retained by the coupling member 74 mounted to the inner peripheral surface of the protruding portion 75b, while the brim portion 66a is covered with the protruding portion 75b. With the structure, the first member 66 and the second member 67 are relatively-rotatably and axially non-movably coupled to each other. A nut accommodation portion 75c is formed in the inner peripheral portion of the knob body 75. The nut portion 72 is axially-movably and integrally-rotatably accommodated in the nut accommodation portion 75c.

The cover portion 76 covers the entire front surface and a part of the outer peripheral surface of the disk portion 75a of the knob body 75. As a result, the knob body 75 is accommodated in the spool 4 and is not exposed to the outside. Note that the knob body 75 is made of synthetic resin and forms a main structural part of the drag knob assembly 61. The front surface of the cover portion 76 is a slight concavity. Specifically, the thickness of the cover portion 76 is gradually reduced toward its center part. The operating knob 77 is arranged along the diameter of the cover portion 76, and protrudes forward.

The coupling member 74 is formed by folding an elastic metal wire rod. The coupling member 74 is a C-shaped spring member with four pointed portions 74a. When the pointed portions 74a are connected, a hypothetical rectangular is formed in an approximately square shape. The pointed portions 74a are interlocked with an annular groove formed on the inner peripheral surface of the protruding portion 75b. Thus the coupling member 74 is mounted to the inner peripheral surface of the protruding portion 75b. In addition, the coupling member 74 includes three circular arc portions 74b among the pointed portion2 74a. The circular arc portions 74b make contact with the rear surface of the brim portion 66a. Thus the coupling member 74 retains the brim portion 66a.

The nut portion 72 is a hexagonal nut, for instance. The nut portion 72 is screwed onto a male threaded portion 15b formed on the outer peripheral surface of the tip of the spool shaft 15, and compresses the spring member 73 depending on rotation of the knob body 75.

The first sealing member 64 is made of synthetic rubber and is formed in a disk shape, for instance. The first sealing member 64 is arranged between the inner peripheral surface of the mounting tubular portion 53a of the support tubular portion 53 of the spool 4 and the outer peripheral surface of the cylindrical portion 66b of the first member 66. The first sealing member 64 is prevented from moving backward by a locking ring 70 mounted to the annular groove 66d. The inner peripheral surface of the first sealing member 64 is mounted to the cylindrical portion 66b of the first member 66, and its outer peripheral part makes contact with the inner peripheral surface of the mounting tubular portion 53a of the support tubular portion 53. A reinforcing plate 81 is buried in the first sealing member 64. For example, the reinforcing plate 81 is made of stainless alloy and is formed in a disk shape. When the first sealing member 64 is molded, the reinforcing plate 81 is inserted into a mold. Thus, the insert molding is performed. A lip portion 64a is formed on the outer peripheral portion of the first sealing member 64. The lip portion 64a makes contact with the inner peripheral surface of the mounting tubular portion 53a. The cross section of the lip portion 64a is formed in a tapered shape. In other words, the lip portion 64a is sloped forward. Furthermore, an annular protruding portion 64b is formed on the first sealing member 64. The annular protruding portion 64b is circumferentially arranged between the lip portion 64a and the opening formed in the center part of the first sealing member 64. The annular protruding portion 64b protrudes forward, and its cross section is formed in a triangle shape. The annular protruding portion 64b makes contact with the rear surface of the second sealing member 65. Also, the front surface of the lip portion 64a of the first sealing member 64 makes contact with the rear end portion of the outer peripheral surface of the second sealing member 65.

For example, the second sealing member 65 is a tubular member with a bottom portion and is made of synthetic rubber. The second sealing member 65 is arranged between the first sealing member 64 and the second member 67. The second sealing member 65 includes a contact portion 65a, an annular recess 65b, and a disk portion 65c. The contact portion 65a is formed in a tubular shape and is capable of making contact with the outer peripheral surface of the protruding portion 75b of the knob body 75 of the second member 67. The annular recess 65b is formed on the inner peripheral side of the contact portion 65a and is engaged with the rear end surface of the protruding portion 75b. The disk portion 65c is mounted to the outer peripheral surface of the cylindrical portion 66b of the first member 66.

In the drag knob assembly 61 with the structure, the second sealing member 65 is arranged between the first member 66 and the second member 67, and includes the tubular contact portion 65a making contact with the outer peripheral surface of the protruding portion 75b of the second member 67. A gap between the first member 66 and the second member 67 is sealed by the second sealing member 65. Also, a gap between the spool 4 and the first member 66 is sealed by the first sealing member 64 arranged between the spool 4 and the first member 66. Here, the tubular contact portion 65a of the second sealing member 65 makes contact with the outer peripheral surface of the protruding portion 75b of the knob body 75 of the second member 67. Here, even if the first sealing member 64 and the second sealing member 65 are integrally formed, the second sealing member 65 is not easily deformed when water pressure is applied to the first sealing member 64 and the first sealing member 64 is accordingly pressed down. Therefore, even if water pressure is applied to the sealing members 64 and 65, liquid will not easily enter the interior of the drag knob assembly from a gap between the first member 66 and the second member 67. According to the present embodiment, the first and second sealing members 66 and 67 are separately formed. Even if the first sealing member 64 is deformed, the second sealing member 65 will not be easily deformed. Accordingly, liquid will less easily enter the interior of the drag knob assembly 61.

As illustrated in FIG. 10, the knob sound generation mechanism 68 includes the sound generation disk 69, a hitting pin 82 (an example of a hitting member), and a coil spring 83. The sound generation disk 69 includes the sound generation recesses 69a. The hitting pin 82 is mounted to the knob body 75 and is capable of moving back and forth. The coil spring 83 urges the hitting pin 82 toward the sound generating recesses 69a. Diameter of the center portion of the hitting pin 82 is greater than that of the front end and rear end portions of the hitting pin 82. The front end portion of the hitting pin 82 is formed in a hemispherical shape. When the second member 67 and the first member 66 relatively rotate in a drag operation, the hitting pin 82 repeatedly hits the sound generating recesses 69a and generates sounds.

Configuration of Friction Section

The drag washer 62a of the friction section 62 is a metal disk member. As illustrated in FIG. 8, the drag washer 62a makes contact with the first member 66 through the first support portion 56. The drag washer 62a is non-rotatably fixed to the spool shaft 15. The drag washer 62b is a metal disk member and is capable of integrally rotating with the spool 4. Similarly to the drag washer 62b, the drag washer 62c is a metal disk member and is non-rotatably fixed to the spool shaft 15. The drag washer 62d is a disk member made of felt or graphite, for instance. The drag washer 62d is capable of rotating with respect the spool 4 and the spool shaft 15. An oval shaped interlocking slot 62e is formed in the center parts of the drag washers 62a and 62c, respectively. The interlocking surfaces 15a formed on the tip side of the spool shaft 15 are interlocked with the interlocking slots 62e. A plurality of (e.g., eight) lug portions 62f are formed on the outer peripheral surface of the drag washer 62b. The lug portions 62f radially protrude outward. The lug portions 62f are interlocked with a plurality of interlocking recesses 52a. The interlocking recesses 52a are axially formed on the inner peripheral surface of the drag accommodation tubular portion 52. The interlocking recesses 52 are also circumferentially separated from each other. With the structure, the drag washer 62b is capable of integrally rotating with the spool 4.

The drag washers 62a to 62d are retained by the first support portion 56 supporting the support tubular portion 53. Therefore, attachment/detachment of the drag washers 62a to 62d is not allowed unless the retaining spring 55 arranged in front of the support tubular portion 53 is removed.

The drag sound generation mechanism 85 is configured to generate sounds when the spool shaft 15 and the spool 4 relatively rotate by the drag activation. As illustrated in FIG. 8, the drag sound generation mechanism 85 includes a first sound generation member 86 and a second sound generation member 87. The first sound generation member 86 are mounted to the rear surface of the rear flange portion 4h of the spool, and integrally rotates with the spool 4. The second sound generation member 87 repeatedly hits the first sound generation member 86.

The first sound generation member 86 is metal cylindrical member with a brim. Its inner peripheral surface includes a plurality of sound generation recesses 86. The sound generation recesses 86 are formed in a circular arc shape. A name plate 88 is arranged on the rear surface of the first sound generation member 86. The name plate 88 and the first sound generation member 86 are fixed to the rear surface of the rear flange portion 4h by means of screws.

The second sound generation member 87 includes two hitting pins 87a and two spring members 87. The hitting pins 87a moves to/away from the sound generation recesses 86a. The spring members 87b urge the hitting pins 87a toward the sound generation recesses 86a. The hitting pins 87a are accommodated in an accommodation member 89. The accommodation member 89 is formed in a tubular shape and is non-rotatably interlocked with the second interlocking surfaces 57d of the second support portion 57. The accommodating member 89 includes an accommodation body 89a and a cover 89b. The accommodation body 89a is formed in a thick walled cylindrical shape, and includes two accommodation grooves 89c for accommodating the hitting pins 87a. The hitting pins 87a are capable of moving into/out of the accommodation grooves 89c. The cover 89b is formed in a disk shape and is fixed to the accommodation body 89a by means of screws. Thus the cover 89b covers the accommodation grooves 89c. The cover 89b is also interlocked with the second interlocking surfaces 57d. The accommodation grooves 89c are opened to the outer peripheral surface of the accommodation body 89a. A gap between the accommodation grooves 89c becomes narrow toward the outer peripheral surface of the accommodation body 89a. The cover 89b includes an interlocking slot 89d on its inner peripheral surface. The second interlocking surfaces 57d are interlocked with the interlocking slot 89d. A washer 101 is arranged between the accommodation member 89 and the support wall portion 4e of the spool 4.

Three spool position regulation washers 102 and two restricting waters 103 and 104 are mounted to the rear surface of the cover 89b. For example, the spool position regulation washers 102 are made of synthetic resin. The first interlocking surfaces 57c of the second support portion 57 are interlocked with the spool position regulation washers 102. The restricting washers 103 and 104 restrict the rearward movement of the spool 4. The restricting washers 103 and 104 include interlocking slots 103a and 104a on their inner peripheral portions, respectively. The interlocking surfaces 15a of the spool shaft 15 are interlocked with the interlocking slots 103a and 104a. Thus, the restricting washers 103 and 104 are non-rotatably fixed to the spool shaft 15. The restricting washer 104 is a stepped washer, and holds a third sealing member 105 with the restricting washer 103. The outer peripheral portion of the third sealing member 105 makes contact with the inner peripheral surface of the first sound generation member 86. The third sealing member 105 is mounted for preventing liquid from entering the interior of the spool 4 including the friction section 62 from the rear surface of the spool 4.

Operation and Movement of Reel

Before starting fishing, the drag force is regulated depending on size and sort of a fish. The drag knob assembly 61 is rotated for regulating the drag force. For example, when the drag knob assembly 61 is rotated in the clockwise direction, the first member 66 is pressed toward the friction section 62 through the spring member 73 by means of the nut portion 72 screwed onto the spool shaft 15. Accordingly, the drag force will be increased. Here, the first member 66 and the second member 67 relatively rotate, and accordingly the hitting pin 82 repeatedly hits the sound generation recesses 69a at a predetermined period. Consequently, rhythmical click sounds are generated.

In casting, the bail arm 34 is flipped over to the line releasing posture. Accordingly, the first bail support member 40 and the second bail support member 42 pivot. In this condition, an angler casts the fishing rod while grasping the fishing line with the index finger of the hand holding the fishing rod.

Consequently, the fishing line is released with high momentum due to the weight of a tackle. When the handle assembly 1 is rotated in the line winding direction in this condition, the rotor 3 is rotated in the line winding direction by means of the rotor driving mechanism 5. The bail arm 34 is returned to the line winding position by means of a bail flipping mechanism (not illustrated in the figure), and the fishing line is moved from the bail 45 to the line roller 41. Thus, the fishing line is wound around the spool 4.

When a big fish is hooked in fishing and the line roller 41 is under heavy load, the fixing shaft 43 may be slightly sloped and wobble by the load change. Note that the fixing shaft 43 is cantilevered by the first bail support member 40. According to the present embodiment, the anti-rotation member 46 prevents rotation of the fixing bolt 46 for fixing the fixing shaft 43 to the first bail support member 40. Therefore, the fixing bolt 46 is not easily loosened even in the load change condition.

When the spinning reel is soaked and cleaned in fresh water contained in a bucket after fishing, the first sealing member 64 may be pressed down to the rearward by the water pressure and may be accordingly deformed. When a gap between the first member 66 and the second member 67 is sealed by the first sealing member 64, the deformation of the first member 66 enables liquid to enter the interior of the drag knob assembly 61 from the gap. However, according to the present embodiment, the tubular shaped contact portion 65a is mounted to the second sealing member 65, and makes contact with the outer peripheral surface of the protruding portion 75b of the second member. Therefore, liquid does not easily enter the interior of the drag knob assembly 61 even if the first sealing member 64 is deformed by the water pressure. With the structure, liquid does not easily enter the friction section 62 via the outer peripheral portion of the spool shaft 15 from the inner portion of the drag knob assembly 61. As a result, the drag force is not easily changed by the wet friction section 62.

Other Example Embodiments (a) In the above-mentioned embodiment, a special bolt member is used as the fixing bolt 46. Specifically, the fixing bolt 46 includes the anti-rotation recesses 46b formed on all the lateral sides of the octagonal head portion 46a. However, any type of the bolt member may be used as the fixing bolt 46 as long as the bolt member includes a non-circular head portion for preventing its rotation. Especially, if the shape of the head portion is regular polygon with N-vertices (note that "N" is integer greater than or equal to 3 and less than or equal to 10), a commercial bolt member may be used. Accordingly, it is possible to reduce cost for the fixing bolt.

Figure 11:
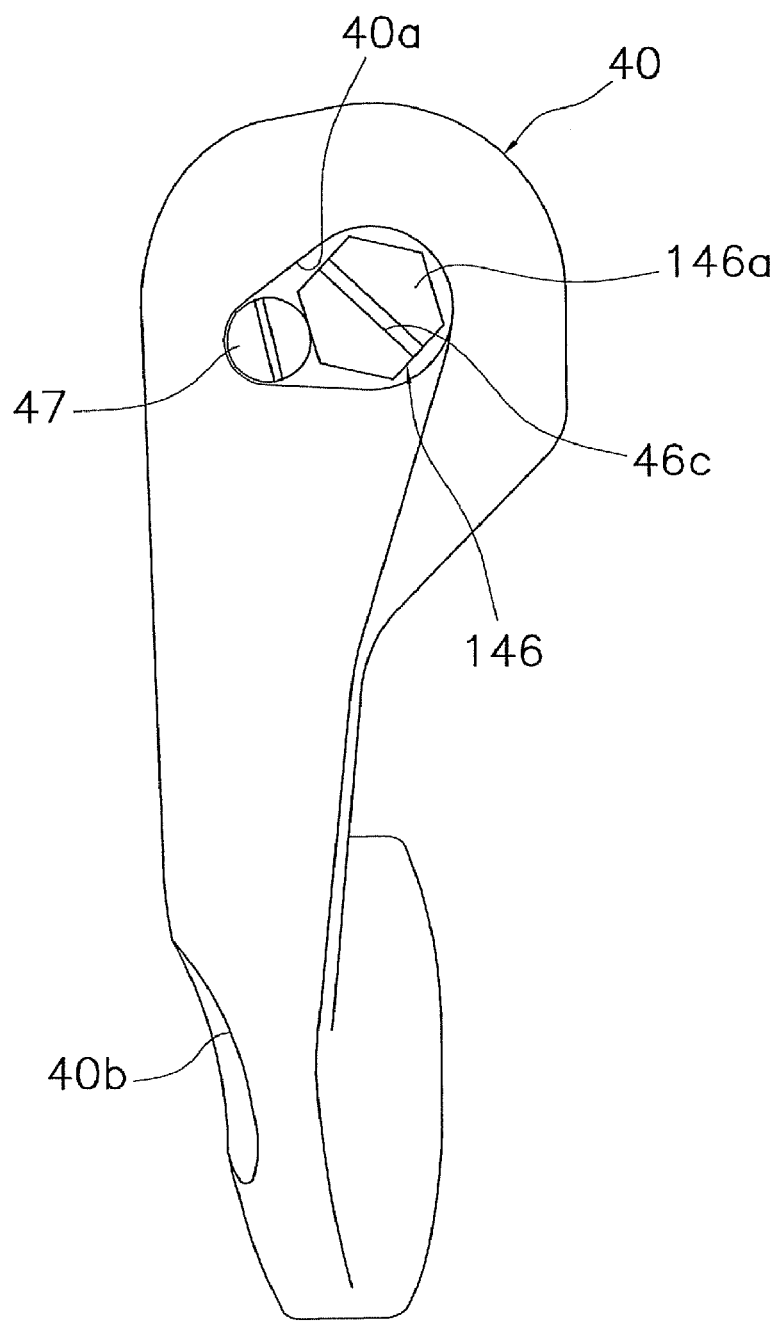
FIG. 11 corresponds to FIG. 5 in accordance with another embodiment of the present invention.

In FIG. 11, a fixing bolt 146 is a hexagon bolt with a hexagonal head portion 146a (an example of the non-circular head portion). Anti-rotation member 47 is a set screw similar to the anti-rotation member 47 mentioned in the embodiment herein above. The anti-rotation member 47 makes contact with the lateral side of the hexagonal head portion 146a, and thus prevents rotation of the fixing bolt 146.

(b) In the above-mentioned embodiment, the anti-rotation member 47 is a set screw, i.e. a slotted set screw without a head portion. However, the anti-rotation member 47 may be a bolt member with a head portion. Any type of the anti-rotation member may be used as long as it is engaged with the non-circular head portion 46a of the fixing bolt 46. For example, the anti-rotation member 47 may be a plate shaped member to be engaged with the head portion 46a of the fixing bolt 46.

Figure 12:
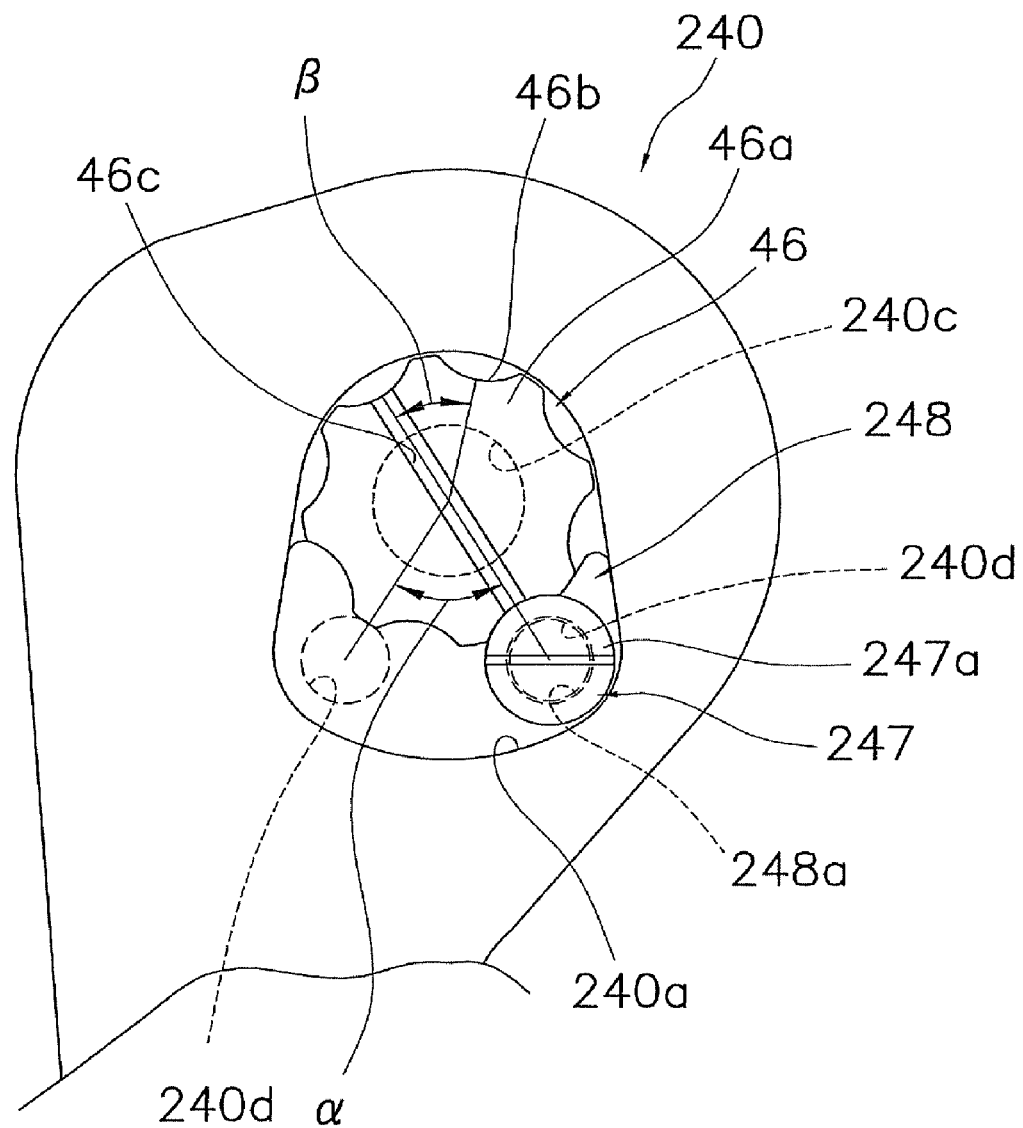
FIG. 12 corresponds to FIG. 5 in accordance with yet another embodiment of the present invention.

In FIG. 12, a fixing bolt 46 is similar to the fixing bolt 46 of the above-mentioned embodiment. An anti-rotation member 247 is a small head screw with a head portion 247a. Also, two screw holes 240d are formed within a first accommodation recesses 240a (an example of a non-circular recess) of a first bail support member 240. The anti-rotation member 247 is screwed into either of the screw holes 240d. As illustrated in FIG. 12, the screw holes 240d are arranged at the same distance from the center of the head portion 46a. In other words, the centers of the screw holes 240d are arranged on the arc of a predetermined theoretical circle formed around the center of the head portion 46a. Here, a central angle α is formed by the center of the head portion 46a and the centers of the screw holes 240d. Also, a central angle β is formed by the center of the head portion 46a and each side of the octagonal head portion 247a. The central angle β corresponds to 45 degrees. On the other hand, the central angle α is configured to be different from the central angle β. Specifically, the central angle α falls in the range of 30 to 90 degrees. The first accommodation recess 240a is formed in such a shape that a theoretical large diameter circle and two theoretical small diameter circles are connected with a line. A through hole 240c is formed in the center of the theoretical large diameter circle, and the fixing bolt 46 penetrates the through hole 240c. On the other hand, two screw holes 249d are formed in the centers of the theoretical small diameter circles.

A cover member 248 is mounted to the outer side of the head portion 46a mounted within the first accommodation recess 240a for covering either of the screw holes 240d currently not used (i.e., the screw hole 240d on the left side in FIG. 12). The cover member 248 is fixed to the first accommodation recess 240a by means of the anti-rotation member 247. Here, the cover member 248 includes a through hole 248a that the anti-rotation member 247 penetrates. The through hole 248a is opposed to the currently not-used screw hole 240d, and the diameter of the through hole 248a is greater than that of the screw hole 240d. The cover member 248 is formed in a plate shape, and its outer shape is engaged with the first accommodation recess 240a and the anti-rotation recesses 46b of the head portion 46a. In the present embodiment, the cover member 248 and the anti-rotation member 247 function as the anti-rotation member with respect to the head portion 46a. Therefore, if only the cover member 248 prevents rotation of the head portion 46a, the head portion 247a of the anti-rotation member 247 may not be necessarily engaged with the anti-rotation recesses 46b.

According to the structure of the present embodiment, the anti-rotation member 247 may be screwed into either of the screw holes 240d formed within the first accommodation recess 240a for preventing rotation of the head portion 46a. Accordingly, it is possible to prevent rotation of the head portion 46a in a finer phase. Note that the cover member 248 is used while it is turned inside out if the screw hole 240d on the left side is used for preventing rotation of the head portion 46a.

(c) In the above-mentioned embodiment, the present invention is explained with an example of a fishing line guiding mechanism having the bail 45. However, it is possible to apply the present invention to all the fishing line guiding mechanisms to be provided in a rotor. For example, the present invention may be applied to a fishing line guiding mechanism without a bail.

(d) In the above-mentioned embodiment, the anti-rotation recesses 46b are concave shaped for allowing them to be engaged with the outer peripheral surface of the anti-rotation member 47. However, the shapes of the anti-rotation recesses 46b are not limited to that of the above-mentioned embodiment. For example, the anti-rotation recesses 46b may be formed in a V-shape or in a trapezoidal shape.

(e) In the above-mentioned embodiment, the fixing shaft 43 and the fixing shaft cover 44 are separately formed. However, it is possible to apply the present invention to a bail arm that the fixing shaft and the fixing shaft cover are integrally formed.

(f) In the above-mentioned embodiment, the present invention is described as using a fixing bolt 46 as the fixing member. However, it is possible to apply a fixing nut 346 to the fixing member.

Figure 13:
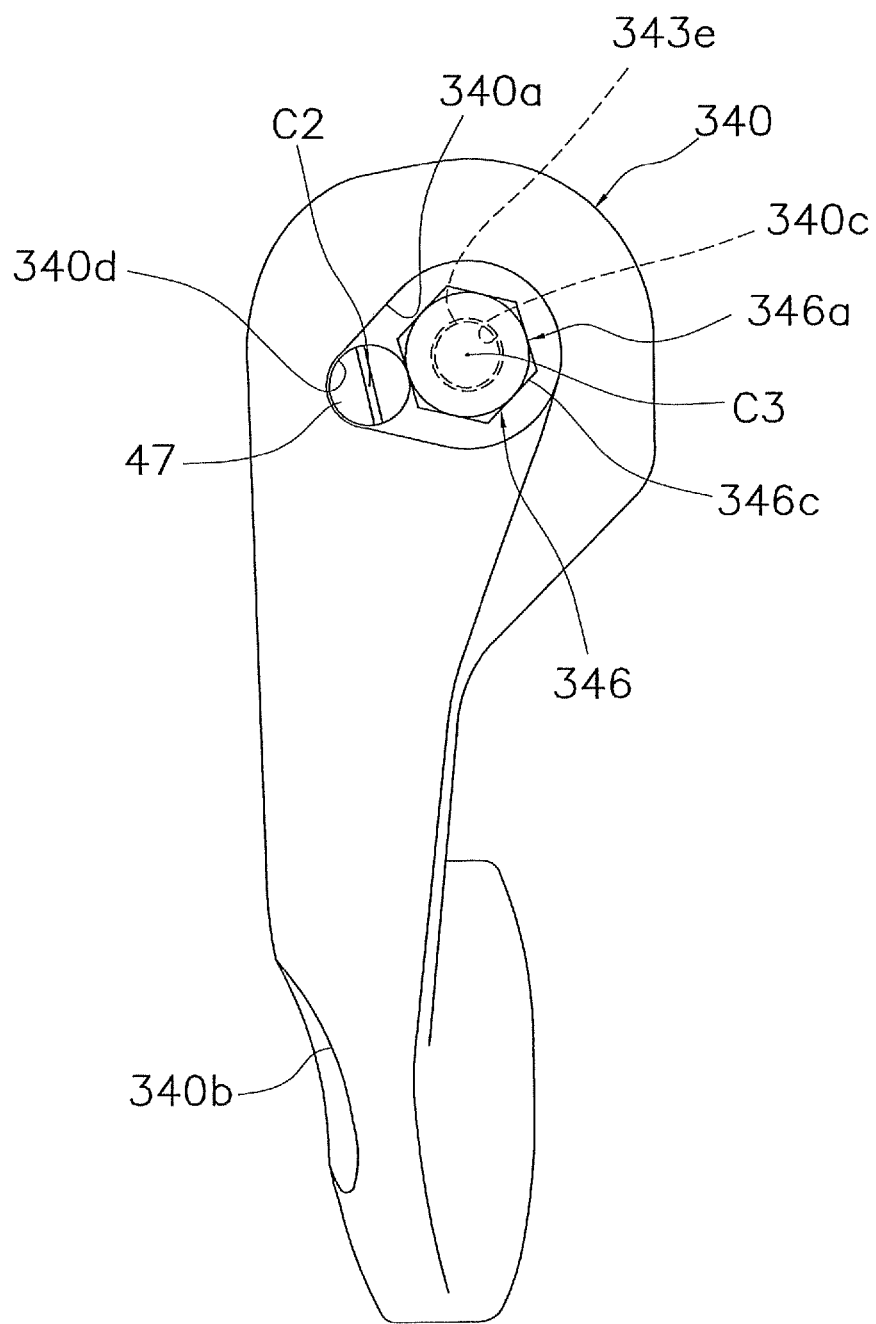
FIG. 13 corresponds to FIG. 5 in accordance with still another embodiment of the present invention.
Figure 14:
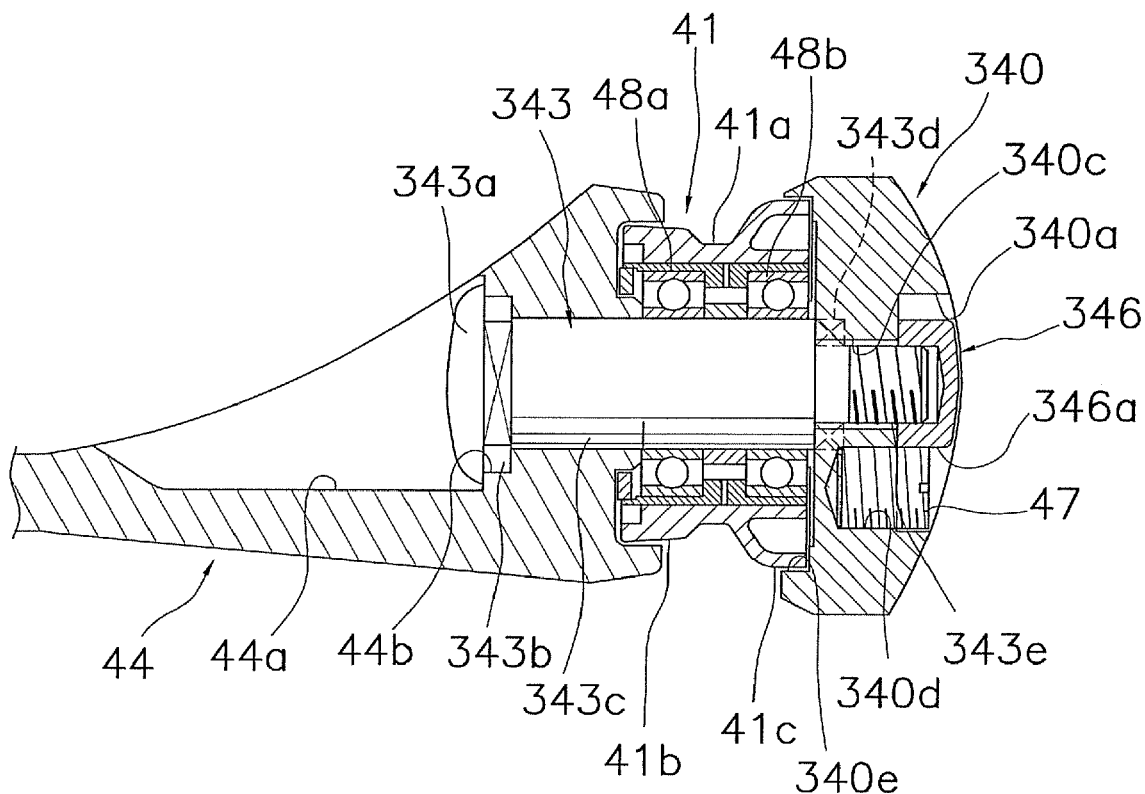
FIG. 14 corresponds to FIG. 6 in accordance with still another embodiment of the present invention.

In FIGS. 13 and 14, all components, except for a first bail member 340, a fixing shaft 343 and a fixing nut, are similar to those in the above embodiments of FIGS. 5 and 6 so that further explanation is omitted. As illustrated in FIGS. 13 to 14, the first bail support member 340 is a member made of aluminum alloy. The outer surface of the first bail support member 340 is covered with a metal film such as chrome plating. The chrome plating hardens the outer surface of the first bail support member 340, and accordingly, the outer surface is protected from being scratched when contacted by the fishing line.

A first accommodation recess 340a (an example of a non-circular recess) is formed on the front end side of the outer surface of the first bail support member 340. An outer peripheral side surface 346a (an example of a non-circular side surface) of the fixing nut 346 is provided in the first accommodation recess 340a. The outer peripheral side surface 346a has a plurality of side portions. Each of the side portions may have a concave shape. Also, a tool used to engage the outer peripheral side surface 346a and capable of rotating the fixing nut 346 may fit into the first accommodation recess 340a.

A second accommodation recess 340b is formed on the base end side of the first bail support member 340. The second accommodation recess 340b has a circular shape and arranged to accommodate a head portion 49a of an attachment bolt 49. The attachment bolt 49 is used for attaching the first bail support member 340 to the first rotor arm 31. The first accommodation recess 340a is a cavity that has, to some extent, a raindrop shape. Here, the raindrop shape is formed by connecting theoretical large and small circles. A through hole 340c is formed in Center C3 of the theoretical large diameter circle in the first accommodation recess 340a. A male threaded portion 343e of a fixing shaft 343 penetrates the through hole 349c. On the other hand, a screw hole 340d is formed in Center C2 of the theoretical small diameter circle in the first accommodation recess 340a. The anti-rotation member 47 is screwed into the screw hole 340d.

A third accommodation recess 340e is formed on the inner surface of the first bail support member 340. The third accommodation recess 40e has a circular shape. The line roller 41 is arranged in the third accommodation recess 340e. The fixing shaft 343 is separately formed from the fixing shaft cover 44. The fixing shaft 343 is provided for fixing the fixing shaft cover 44 to the first bail support member 340 and for rotatably supporting the line roller 41. The fixing shaft 343 includes a head portion 343a, a first interlocking portion 343b, a support portion 343c, and a second interlocking portion 343d. The head portion 343a has a large diameter. The first interlocking portion 343b is continuously formed from the head portion 343a and has diameter less than that of the head portion 343a. The support portion 343a supports the line roller 41. The second interlocking portion 343d is formed on the tip of the support portion 343c. The male threaded portion 343e is formed on the tip portion of the fixing shaft 343. The fixing nut 346 is screwed onto the male threaded portion 343e. The first interlocking portion 343b is interlocked with the fixing shaft cover 44. The second interlocking portion 343d is interlocked with the first bail support member 340. Thus, the interlocking action prevents rotation of the fixing shaft cover 44, the fixing shaft 343, and the first bail support member 340. The fixing nut 346 is, for example, a cap nut with a non-circular outer peripheral side surface 346a. The outer peripheral surface 346a is a regular polygon with N-vertices (i.e. "N" is an integer greater than or equal to 3 and less than or equal to 10). In the present embodiment, the outer peripheral surface 346a has a hexagon shape that includes a plurality of side portions. Each of the side portions of the outer peripheral side surface 346a is capable of contacting the anti-rotation member 47. As shown in the embodiments of FIGS. 5 and 6, each of the side portions of the regular polygon with N-vertices may have, for example, a concave shape. As such, it is not necessary to form a slit in the fixing nut 346 to operate as the tool interlocking portion 46c described earlier, since the non-circular outer peripheral side surface 346a may operates as the tool interlocking portion.

When the tool is used to attach the fixing nut 346 to the fixing shaft 343, a portion of the outer peripheral side surface 346a engages the anti-rotation member 47. Thus, the fixing nut 346 is prevented from rotating as a result of the anti-rotation member 47. This embodiment provides the same work effect as from the above embodiments.

General Interpretation

As used herein, the following directional terms "forward, rearward, above, downward, vertical, horizontal, below and transverse" as well as any other similar directional terms refer to those directions of a device equipped with the present invention. Accordingly, these terms, as utilized to describe aspects of the present invention should be interpreted relative to a device equipped with the present invention.

The term "configured" as used herein to describe a component, section or part of a device includes hardware and/or software that is constructed and/or programmed to carry out the desired function.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applied to words having similar meanings such as the terms, "including," "having," and their derivatives. Also, the term "part," "section," "portion," "member," or "element" when used in the singular can have the dual meaning of a single part or a plurality of parts.

The terms of degree such as "slight", "substantially", "about", "approximately" and "to so extent" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A fishing line guiding mechanism of a spinning reel, the fishing line guiding mechanism being provided in a rotor and configured to guide a fishing line to a spool, the rotor including a first rotor arm and a second rotor arm opposed to the first rotor arm, the fishing line guiding mechanism comprising:

a first bail support member pivotally coupled to the first rotor arm;

a fixing shaft fixed to the first bail support member;

a line roller for guiding the fishing line, the line roller being rotatably supported by the fixing shaft;

a fixing shaft cover disposed on a tip side of the fixing shaft;

a fixing member for fixedly coupling the fixing shaft to the first bail support member, the fixing member including a non-circular head portion; and an anti-rotation member detachably mounted to the first bail support member, the anti-rotation member arranged to contact the outer peripheral surface of the non-circular head portion to prevent rotation of the fixing member.

2. The fishing line guiding mechanism according to claim 1, wherein the fixing shaft includes a female threaded portion formed in a tip portion of the fixing shaft, the fixing member being fixedly coupled to the fixing shaft.

3. The fishing line guiding mechanism according to claim 2, wherein the fixing member includes a fixing bolt having a non-circular head portion, the fixing bolt being screwed onto the female thread portion.

4. The fishing line guiding mechanism according to claim 1, wherein the fixing shaft includes a male threaded portion formed in a tip portion of the fixing shaft, the fixing shaft being fixedly coupled to the fixing member.

5. The fishing line guiding mechanism according to claim 4, wherein the fixing member includes a fixing nut having a non-circular outer peripheral surface, the fixing nut being screwed onto the male thread portion.

6. The fishing line guiding mechanism according to claim 1, wherein the anti-rotation member includes a set screw fastened to the first bail support member to prevent rotation of the fixing member.

7. The fishing line guiding mechanism according to claim 1, wherein the first bail support member includes a first screw hole adapted to receive the anti-rotation member, the first screw hole being arranged to allow the anti-rotation member to make contact with the outer peripheral surface of the non-circular head portion.

8. The fishing line guiding mechanism according to claim 7, wherein the anti-rotation member includes a set screw.

9. The fishing line guiding mechanism according to claim 8, wherein the first bail support member further includes a non-circular recess adapted to accommodate the non-circular head portion and the anti-rotation member, the first screw hole being formed in the non-circular recess.

10. The fishing line guiding mechanism according to claim 9, wherein the first bail support member further includes at least a second screw hole formed in the non-circular recess, the additional holes being formed separately from each other in the non-circular recess and arranged at the same distance from the center of the fixing member.

11. The fishing line guiding mechanism according to claim 1, further comprising:

a second bail support member pivotally mounted to the second rotor arm; and a bail arranged to couple the fixing shaft cover and the second bail support member.

12. The fishing line guiding mechanism according to claim 11, wherein the non-circular head portion is a regular polygon with N-vertices (N is integer greater than or equal to 3 and less than or equal to 10), and includes a tool interlocking portion to interlock a tool.

13. The fishing line guiding mechanism according to claim 12, wherein the outer peripheral surface of the non-circular head portion includes at least one anti-rotation recess adapted to engage the outer peripheral surface of the anti-rotation member.

14. A spinning reel comprising, a reel unit;

a rotor having a coupling part, and first and second rotor arms arranged lateral to the coupling part and opposite one to another, the rotor being rotatively supported on a front portion of the reel unit;

a spool supported on a front portion of the rotor; and a fishing line guiding mechanism including a first bail support member pivotally coupled to the first rotor arm, a fixing shaft fixed to the first bail support member, a line roller for guiding the fishing line, the line roller being rotatably supported by the fixing shaft, a fixing shaft cover disposed in the tip side of the fixing shaft, a fixing member for fixedly coupling the fixing shaft to the first bail support member, the fixing member including a non-circular head portion, and an anti-rotation member detachably mounted to the first bail support member, the anti-rotation member arranged to contact with the outer peripheral surface of the non-circular head portion to prevent rotation of the fixing member.

15. The spinning reel according to claim 14, wherein the fixing shaft includes a female threaded portion formed at a tip portion of the fixing shaft, the fixing member being fixedly coupled to the fixing shaft.

16. The spinning reel according to claim 15, wherein the fixing member includes a fixing bolt having a non-circular head portion, the fixing bolt being screwed onto the female thread portion.

17. The spinning reel according to claim 14, wherein the fixing shaft includes a male threaded portion formed at a tip portion of the fixing shaft, the fixing shaft being fixedly coupled to the fixing member.

18. The spinning reel according to claim 17, wherein the fixing member includes a fixing nut having a non-circular outer peripheral surface, the fixing nut being screwed onto the male thread portion.

19. The spinning reel according to claim 14, wherein the anti-rotation member includes a set screw attached to the first bail support member to prevent rotation of the fixing bolt.

20. The spinning reel according to claim 14, wherein the first bail support member includes a first screw hole adapted to receive the anti-rotation member, the first screw hole being arranged to allow the anti-rotation member to make contact with the outer peripheral surface of the non-circular head portion.

21. The spinning reel according to claim 20, wherein the anti-rotation bolt includes a set screw.

22. The spinning reel according to claim 21, wherein the first bail support member further includes a non-circular recess adapted to accommodate the non-circular head portion and the anti-rotation bolt, the first screw hole being formed in the non-circular recess.

23. The spinning reel according to claim 22, wherein the first bail support member further includes at least a second screw hole formed in the non-circular recess, the additional holes being formed separately from each other in the non-circular recess and arranged at the same distance from the center of the fixing bolt.

24. The spinning reel according to claim 14, further comprising:

a second bail support member pivotally mounted to the second rotor arm; and a bail arranged to couple the fixing shaft cover and the second bail support member.

25. The spinning reel according to claim 24, wherein the non-circular head portion is a regular polygon with N-vertices (N is integer greater than or equal to 3 and less than or equal to 10), and includes a tool interlocking portion to interlock a tool.

26. The spinning reel according to claim 25, wherein the outer peripheral surface of the non-circular head portion includes at least one anti-rotation recess adapted to engage the outer peripheral surface of the anti-rotation member.

* * * * *